United States Patent
Cha et al.

(10) Patent No.: US 9,531,819 B2
(45) Date of Patent: Dec. 27, 2016

(54) METHOD AND SYSTEM FOR DISPLAYING OBJECT, AND METHOD AND SYSTEM FOR PROVIDING THE OBJECT

(71) Applicant: SAMSUNG ELECTRONICS CO., LTD., Suwon-si (KR)

(72) Inventors: Sang-ok Cha, Suwon-si (KR); Jong-hyun Ryu, Daejeon (KR); Hee-chul Jeon, Suwon-si (KR); Won-young Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 14/169,182

(22) Filed: Jan. 31, 2014

(65) Prior Publication Data

US 2014/0214924 A1    Jul. 31, 2014

(30) Foreign Application Priority Data

Jan. 31, 2013  (KR) .................. 10-2013-0011492
Jul. 19, 2013  (KR) .................. 10-2013-0085680

(51) Int. Cl.
*G06F 15/16*    (2006.01)
*H04L 29/08*    (2006.01)
(Continued)

(52) U.S. Cl.
CPC ........ *H04L 67/16* (2013.01); *H04N 21/41407* (2013.01); *H04N 21/41415* (2013.01);
(Continued)

(58) Field of Classification Search
None
See application file for complete search history.

(56) References Cited

U.S. PATENT DOCUMENTS 6,996,395 B2   2/2006  Rodriguez et al.
8,116,776 B1 *  2/2012  Jagadeesan ........... H04W 36/00
                                                    370/331
(Continued)

FOREIGN PATENT DOCUMENTS

JP    2009-55099 A    3/2009
JP    2009-176329 A   8/2009
(Continued)

OTHER PUBLICATIONS

International Search Report dated May 12, 2014 issued in International Application No. PCT/KR2014/000739 (PCT/ISA/220/210).
(Continued)

*Primary Examiner* — Brian P Whipple
(74) *Attorney, Agent, or Firm* — Sughrue Mion, PLLC

(57) ABSTRACT

A first device for displaying an object related to content reproduced by a second device is provided. The first device including a sensor which senses an exit of the first device from a service zone of the second device during reproduction of the content by the second device; a communication device which requests a management server for an object related to the content, the object including link information for receiving information about the content reproduced by the second device at a point of time when the sensor senses the exit, and for receiving the object related to the content from the management server; and a controller which controls a display to display the received object related to the content on a predetermined screen of the first device.

38 Claims, 21 Drawing Sheets

(51) Int. Cl.
  *H04N 21/414* (2011.01)
  *H04N 21/422* (2011.01)
  *H04N 21/431* (2011.01)
  *H04N 21/4722* (2011.01)
  *H04N 21/488* (2011.01)
  *H04N 21/442* (2011.01)

(52) U.S. Cl.
  CPC . *H04N 21/41422* (2013.01); *H04N 21/42202* (2013.01); *H04N 21/4316* (2013.01); *H04N 21/44218* (2013.01); *H04N 21/4722* (2013.01); *H04N 21/4882* (2013.01)

(56) References Cited

U.S. PATENT DOCUMENTS

| | | | |
|---|---|---|---|
| 2003/0007515 A1* | 1/2003 | Apostolopoulos | H04L 29/06 370/503 |
| 2003/0009577 A1* | 1/2003 | Apostolopoulos | H04W 36/12 709/231 |
| 2006/0233519 A1 | 10/2006 | Narita | |
| 2010/0259385 A1* | 10/2010 | Alston | G06Q 10/087 340/568.1 |
| 2011/0182561 A1 | 7/2011 | Bae | |
| 2012/0066234 A1 | 3/2012 | Lee et al. | |
| 2012/0206423 A1 | 8/2012 | Wong et al. | |
| 2012/0244888 A1 | 9/2012 | Koh et al. | |
| 2012/0254347 A1 | 10/2012 | Seetharam et al. | |
| 2012/0287918 A1 | 11/2012 | Abraham et al. | |
| 2014/0086549 A1* | 3/2014 | Davidson | H04N 21/47214 386/201 |

FOREIGN PATENT DOCUMENTS

| | | |
|---|---|---|
| RU | 2430490 C2 | 9/2011 |
| WO | 2006/089555 A1 | 8/2006 |

OTHER PUBLICATIONS

Written Opinion dated May 12, 2014 issued in International Application No. PCT/KR2014/000739 (PCT/ISA/237).

Communication dated Jun. 3, 2014 issued by the European Patent Office in counterpart European Patent Application No. 14152481.9.

Daisaku Komiya et al; "Use Cases for Session Mobility in Multimedia Applications draft-komiya-mmusic-session-mobility-usecases-00.txt"; Feb. 27, 2006; XP015044303; pp. 1-11.

Communication dated Mar. 11, 2016 issued by the Australian Patent Office in counterpart Australian Patent Application No. 2014213221.

Communication dated Oct. 3, 2016, issued by the Russian Patent Office in counterpart Russian Application No. 2015136790.

* cited by examiner

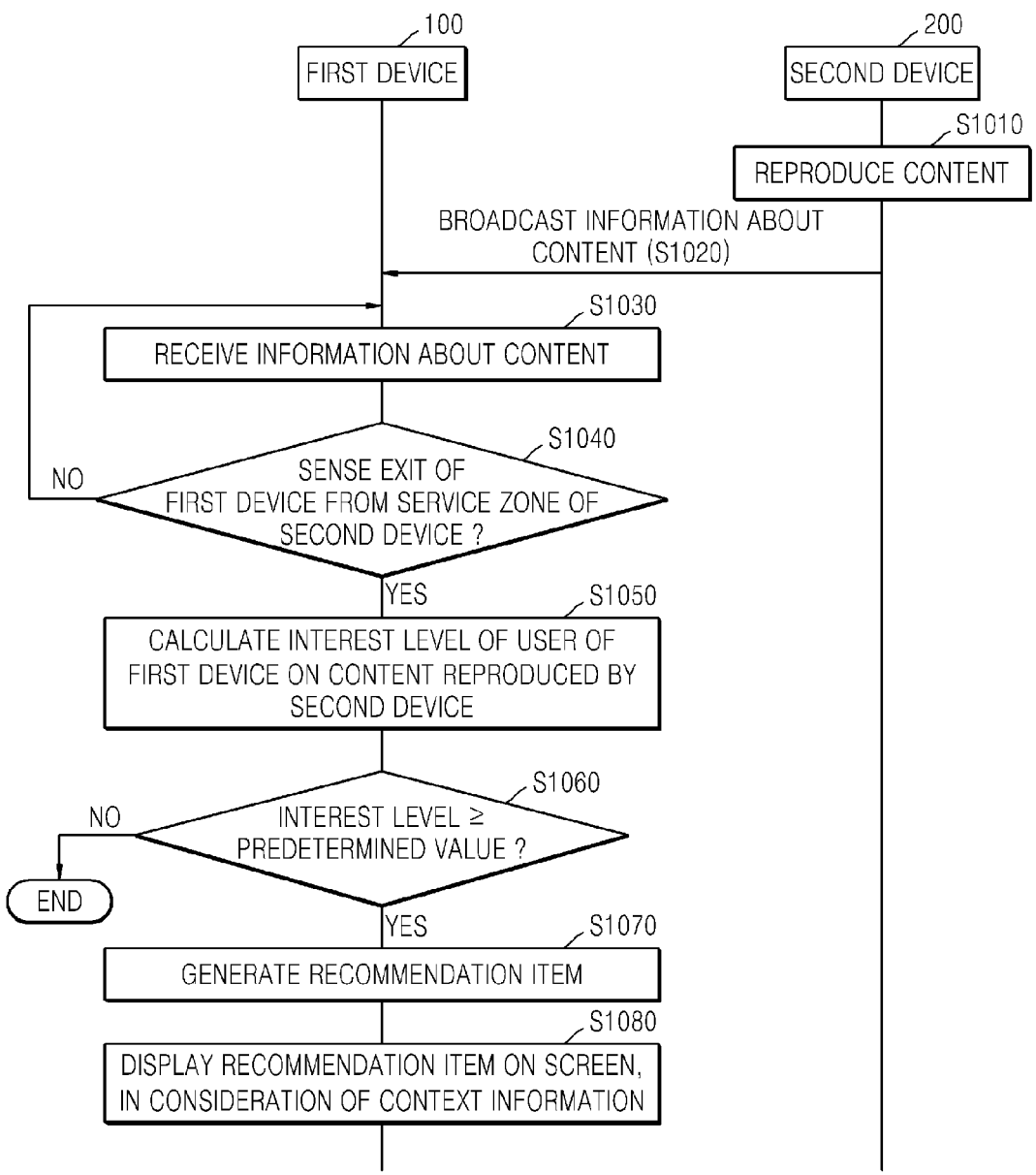

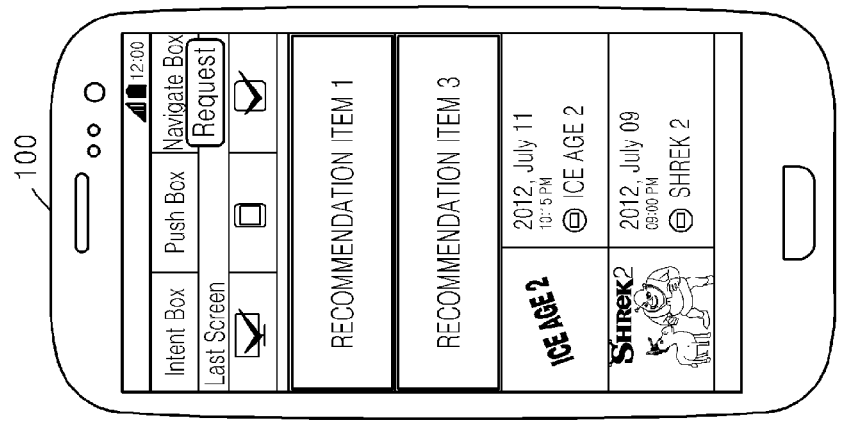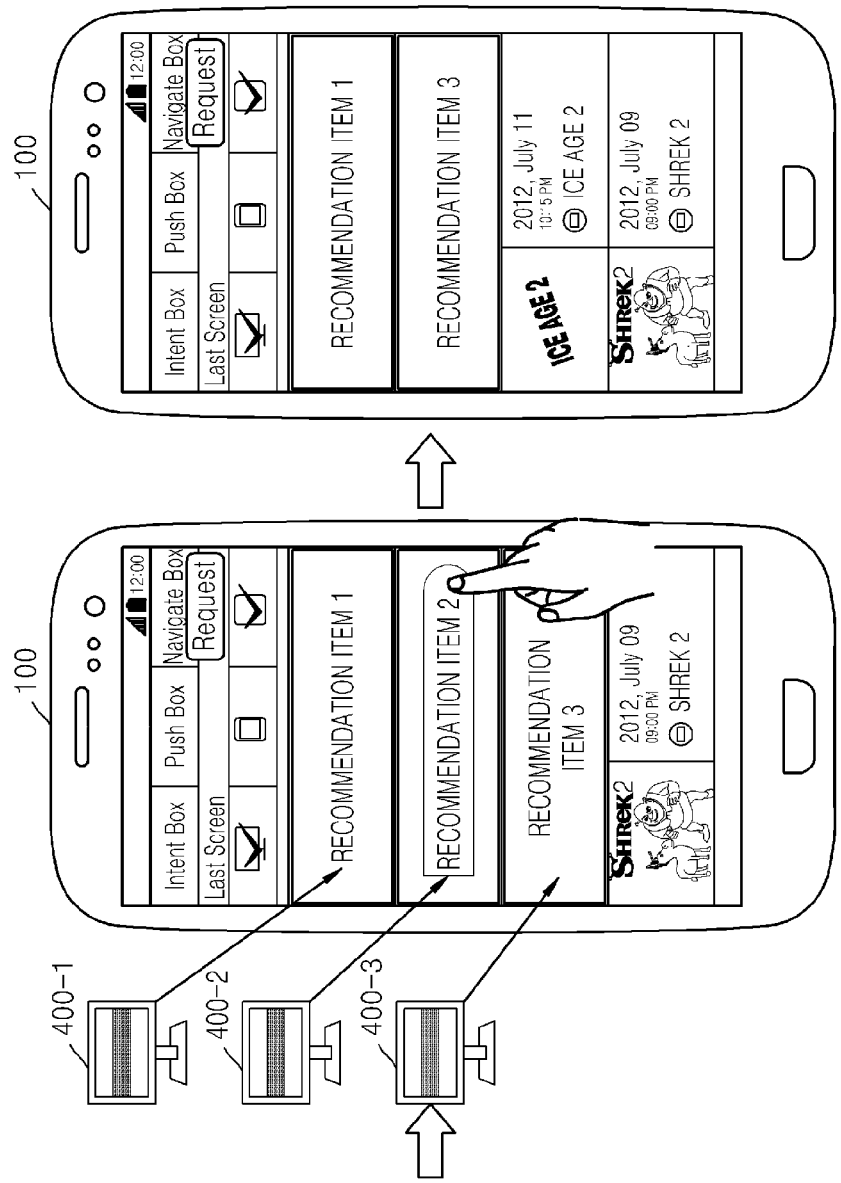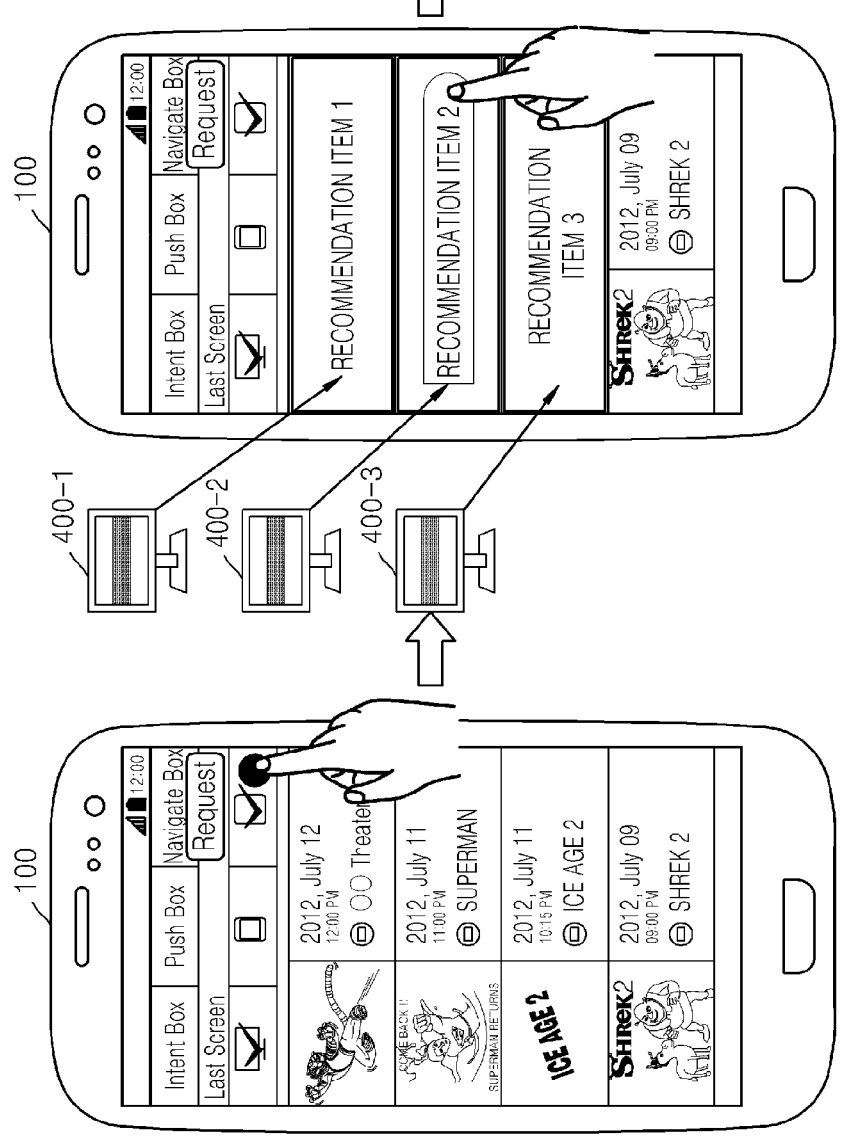

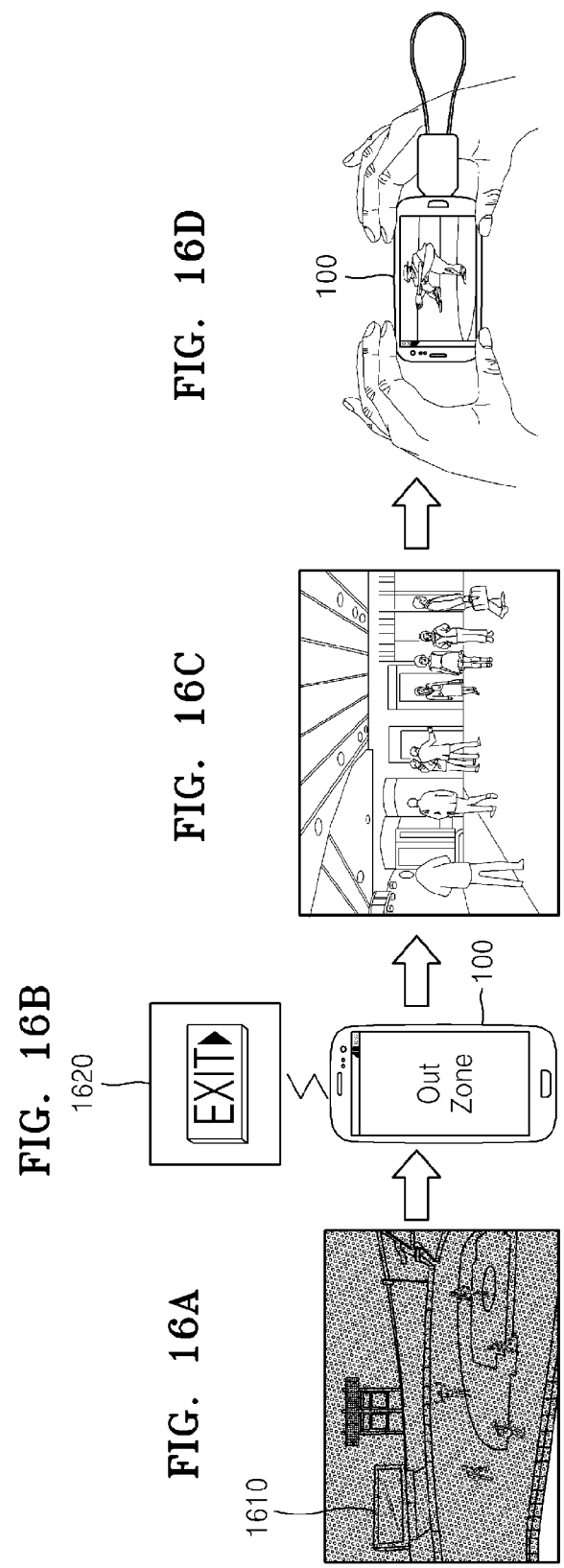

METHOD AND SYSTEM FOR DISPLAYING OBJECT, AND METHOD AND SYSTEM FOR PROVIDING THE OBJECT

RELATED APPLICATIONS

This application claims priority from Korean Patent Application Nos. 10-2013-0011492, filed on Jan. 31, 2013, and 10-2013-0085680, filed on Jul. 19, 2013 in the Korean Intellectual Property Office, the disclosures of which are incorporated herein by reference in their entireties.

BACKGROUND

1. Field

Methods and apparatuses consistent with the exemplary embodiments relate to a method of displaying, on a screen, an object that is related to content reproduced by a second device, and a method and system for providing the object related to the content reproduced by the second device to the first device, the method and system performed by the second device or a management server.

2. Description of the Related Art

Due to the developments in communication and display technologies, users see various types of content that are provided in public places. For example, a user may check various administrative procedures, product information, information about using various facilities, tourist information about surrounding areas, or the like on a display device (e.g., a kiosk) equipped in public places such as a government agency, a local government entity, a department store, an airport, or a railway station. Also, the user may view movie content on a display device available in an airplane or an express bus, or may view broadcasting content such as the news on a display device available at a platform or a waiting room.

Because the user may not remain in the public place, the user has to discontinue viewing of the content reproduced in the public place, and then move to a different location.

Thus, there is a demand for a system that allows a user, after the user exits the public place, to continuously use a service that was provided in the public place, on a personal terminal of the user.

SUMMARY

One or more exemplary embodiments provide a method and system for providing via a first device a recommendation item related to content reproduced by a second device to a user of the first device, wherein the user has been viewing the content and then exits a service zone of the second device.

According to one or more exemplary embodiments, a first device configured to display at least one object related to content reproduced by a second device, the first device comprises a sensor configured to sense an exit of the first device from a service zone of the second device during reproduction of the content by the second device; a communication device configured to request, from a management server, an object related to the content, the object including link information for receiving information about the content reproduced by the second device at a point of time when the sensor senses the exit of the first device, and configured to receive the object related to the content from the management server; and a controller configured to control a display to display the received object related to the content on a predetermined screen of the first device.

According to another aspect of the exemplary embodiments, a management server includes a communication device configured to, if a first device exits a service zone of a second device reproducing content, receive from the first device request information for requesting an object related to the content, request the second device for information about the content reproduced by the second device at a point of time when the first device exits the service zone of the second device, and receive the information about the content from the second device; and a controller configured to generate the object related to the content based on the information about the content, and transmit the generated object related to the content via the communication device to the first device.

According to another aspect of the exemplary embodiments, a first device configured to display an object related to content reproduced by a second device includes a communication device configured to receive an object related to content reproduced by the second device, from the second device in a predetermined cycle, the object including link information for receiving information about the content; and a sensor configured to sense an exit of the first device from a service zone of the second device during reproduction of the content by the second device; and a controller configured to control a display to display the object related to the content on a predetermined screen of the first device at a point of time when the exit of the first device is sensed.

According to another aspect of the exemplary embodiments, a first device configured to display an object related to content reproduced by a second device includes a communication device configured to receive information about content reproduced by the second device, from the second device when the first device is in a service zone of the second device; a sensor configured to sense an exit of the first device from the service zone of the second device during reproduction of the content by the second device; a controller configured to generate the object related to the content based on the received information about the content at a point of time when the exit is sensed; and a display configured to display the generated object related to the content on a predetermined screen of the first device.

According to another aspect of the exemplary embodiments, a method, performed by a first device, of displaying an object related to content reproduced by a second device comprises sensing an exit of the first device from a service zone of the second device during reproduction of the content by the second device; requesting a management server for an object related to the content, the object including link information for receiving information about the content reproduced by the second device at a point of time when a sensor senses the exit of the first device from the service zone of the second device; receiving the object related to the content from the management server; and displaying the received object related to the content on a predetermined screen of the first device.

According to another aspect of the exemplary embodiments, a method, performed by a management server, of providing an object, comprises, if a first device exits a service zone of a second device reproducing content, receiving from the first device request information for requesting an object related to the content; requesting the second device for information about the content reproduced by the second device at a point of time when the first device exits the service zone of the second device; receiving the information about the content from the second device; generating the object related to the content based on the information about the content; and transmitting the generated object related to the content to the first device.

BRIEF DESCRIPTION OF THE DRAWINGS

These and/or other aspects will become apparent and more readily appreciated from the following description of the exemplary embodiments, taken in conjunction with the accompanying drawings in which:

FIG. 10 is a flowchart of a method of displaying a recommendation item, the method performed by the first device, according to another exemplary embodiment;

FIGS. 12A, 12B and 12C illustrate a method of receiving a recommendation item from an external device and displaying the recommendation item, the method performed by the first device, according to an exemplary embodiment;

FIGS. 16A, 16B, 16C and 16D illustrate a method of providing a recommendation item related to sports content played in a sports complex, according to an exemplary embodiment;

DETAILED DESCRIPTION OF EXEMPLARY EMBODIMENTS

Figure 1:
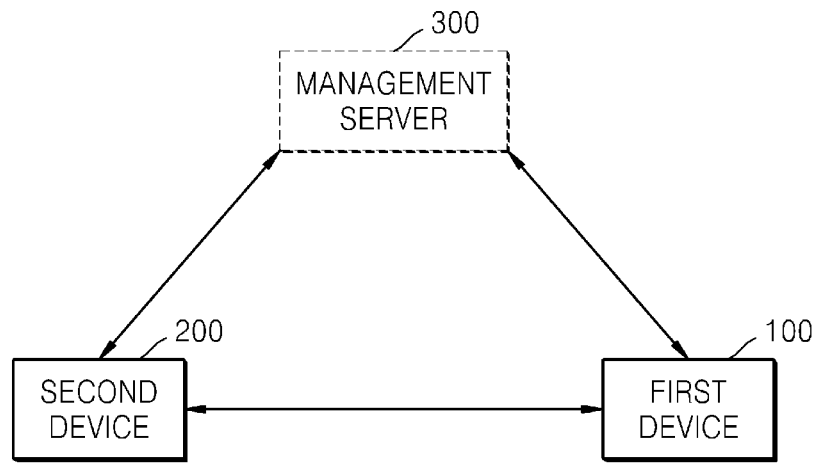
FIG. 1 is a diagram of an object providing system according to an exemplary embodiment.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the exemplary embodiments. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

Throughout the specification, the term "first screen" means a screen that first displays on a device when the device is turned on, a lock on the device is unlocked, or an operation mode of the device is switched from a standby mode to an active mode. In one or more exemplary embodiments, the first screen may be, but is not limited to, a home screen of the device, a menu screen of the device, or a background screen of the device. In one or more exemplary embodiments, the first screen may be a gateway for the device to provide a service. For example, the device may provide a recommended service via the first screen.

One or more exemplary embodiments will now be described more fully with reference to the accompanying drawings. However, the one or more exemplary embodiments may be embodied in many different forms, and should not be construed as being limited to the exemplary embodiments set forth herein; rather, these exemplary embodiments are provided so that this disclosure will be thorough and complete, and will fully convey the concept of the one or more exemplary embodiments to those of ordinary skill in the art. In the following description, well-known functions or constructions are not described in detail since they would obscure the one or more exemplary embodiments with unnecessary detail, and like reference numerals in the drawings denote like or similar elements throughout the specification.

Expressions such as "at least one of," when preceding a list of elements, modify the entire list of elements and do not modify the individual elements of the list.

FIG. 1 is a diagram of an object providing system according to an exemplary embodiment.

As illustrated in FIG. 1, the object providing system may include a first device 100, a second device 200, and a management server 300. However, not all shown elements are necessary elements. That is, the object providing system may be embodied with more or less elements than the shown elements. For example, in other exemplary embodiments, the management server 300 may be or may not be included in the object providing system. First, the exemplary embodiment in which the object providing system includes the management server 300 will now be described, and then another exemplary embodiment in which the object providing system does not include the management server 300 will be described later with reference to FIGS. 6 through 10.

The first device 100 may be a device that displays an object related to content reproduced by an external device (e.g., a public device). Hereinafter, 'the object related to content' may be expressed as a 'recommendation item related to content'. In the present exemplary embodiment, the object related to content may include link information for receiving information related to the content. Here, 'the information related to the content' may be expressed as 'the information about the content'.

The first device 100 may be a personal mobile device. The first device 100 may be variously embodied. For example, throughout the specification, the first device 100 may be, but is not limited to, a mobile phone, a smartphone, a laptop computer, a tablet PC, an electronic book terminal, a terminal for digital broadcast, a personal digital assistant (PDA), a portable multimedia player (PMP), a navigation device, an MP3 player, and a digital camera. The first device 100 may be a wearable device that a user may wear. For example, the first device 100 may be a wristwatch, glasses, a ring, a bracelet, a necklace, or the like, but not limited thereto.

The first device 100 may be positioned in a service zone of the second device 200 and may exit the service zone. The service zone of the second device 200 means an area where the second device 200 may provide a service to a user or another device. For example, the service zone of the second device 200 may include an area where the second device 200 may provide a communication service, an area where the second device 200 may provide a content reproduction service, or the like.

When the first device 100 is positioned in the service zone of the second device 200, the first device 100 may perform communication with the second device 200. For example, the first device 100 may perform short-distance communication with the second device 200. Examples of the short-distance communication may include, but are not limited to, a wireless local area network (LAN) (e.g., Wi-Fi), near field communication (NFC), Bluetooth, Bluetooth Low Energy (BLE), ZigBee, Wi-Fi Direct (WFD), and ultra wideband (UWB). The first device 100 may be wiredly or wirelessly connected with the management server 300.

The first device 100 may request the second device 200 or the management server 300 for a recommendation item and may receive the recommendation item. In the present exemplary embodiment, the recommendation item may be related to the content reproduced by the second device 200. For example, the recommendation item may include, but is not limited to, an application item, a resume item, an additional information item, and an advertisement item that correspond to the content reproduced by the second device 200.

The recommendation item may be configured of an image of the content, and link information or index information each of which is connected to the image, or may be configured in the form of an object for using a service.

Throughout the specification, the term 'object for using a service' indicates a user interface for using a service of a service provider. The object for using a service may be a user interface for using a service that is provided from a server or the service provider. For example, the object for using a service may include the user interface including an icon, text, an image, and link information, and description related to a function of the object.

The first device 100 may receive the object from the server and may use the service of the service provider by using the object. For example, by using the object, the first device 100 may obtain content from an application program in the first device 100, a data source, server, or content provider and may process the content. Also, the object may be a user interface corresponding to a package of services that are provided based on context information of the user (or the first device 100).

In the present exemplary embodiment, the object may not be installed in, or may not be executed by, the first device 100, but may be analyzed by a host program of the first device 100, so that the object may be displayed on a screen of the first device 100 and may be used by the user. The object may be a gadget but an example of the object is not limited thereto.

When the first device 100 exits the service zone of the second device 200, the first device 100 may display, on a screen, the recommendation item related to the content reproduced by the second device 200.

In the first device 100, a seamless sensing platform (SSP) may operate, separately from an application processor (AP). The first device 100 may connect sensors to a sensor hub of the SSP, and therefore may collect a plurality of pieces of sensing information and may recognize a status, without waking up the AP in a sleep mode. When a predetermined circumstance occurs, the sensor hub (e.g., an MCU) of the SSP wakes up the AP in the sleep mode. Each of the SSP and the AP may be implemented as hardware, software, or combination of hardware and software. The SSP will be described in detail with reference to FIG. 17.

The second device 200 may be a display device that reproduces content. In particular, the second device 200 may be a public device. Throughout the specification, the second device 200 may indicate, but is not limited to, a display device and a kiosk (e.g., a digital information display (DID) device or a large format display (LFD) device) that are available in public transportation (e.g., a bus, an airplane, a subway train, a commuter train, or the like), a movie screen device installed in a theater, and an electric signboard used in a sports complex.

The second device 200 may be connected with the first device 100 via the short-distance communication. Also, the second device 200 may perform wired or wireless communication with the management server 300.

The second device 200 may transmit, to the first device 100 or the management server 300, information about reproduced content (e.g., identification (ID), information of the content, reproduction position information of the content, a captured image of the content, application information corresponding to the content, or the like. In another exemplary embodiment, the second device 200 may generate a recommendation item related to the reproduced content and then may transmit the recommendation item to the first device 100 or the management server 300.

The management server 300 may manage at least one second device 200 that provides the content reproduction service, and may provide to the first device 100 the recommendation item related to the content reproduced by the second device 200.

The management server 300 may perform communication with the first device 100 or the second device 200. For example, when the management server 300 receives, from the first device 100, a request for the recommendation item related to the content reproduced by the second device 200, the management server 300 may request the second device 200 for the information related to the content. Then, the management server 300 may generate the recommendation item based on the information related to the content which is received from the second device 200, and may transmit the recommendation item to the first device 100.

The management server 300 may include an intelligence engine that may analyze a plurality of pieces of event information that are collected by the first device 100. For example, the management server 300 may analyze event information and therefore may calculate an interest level of the user of the first device 100 on the content reproduced by the second device 200, a probability that the user of the first device 100 might view the content reproduced by the second device 200, or the like.

Hereinafter, a method of providing a recommendation item to a user via communication among the first device 100, the second device 200, and the management server 300 will be described in detail with reference to FIGS. 2 through 5.

Figure 2:
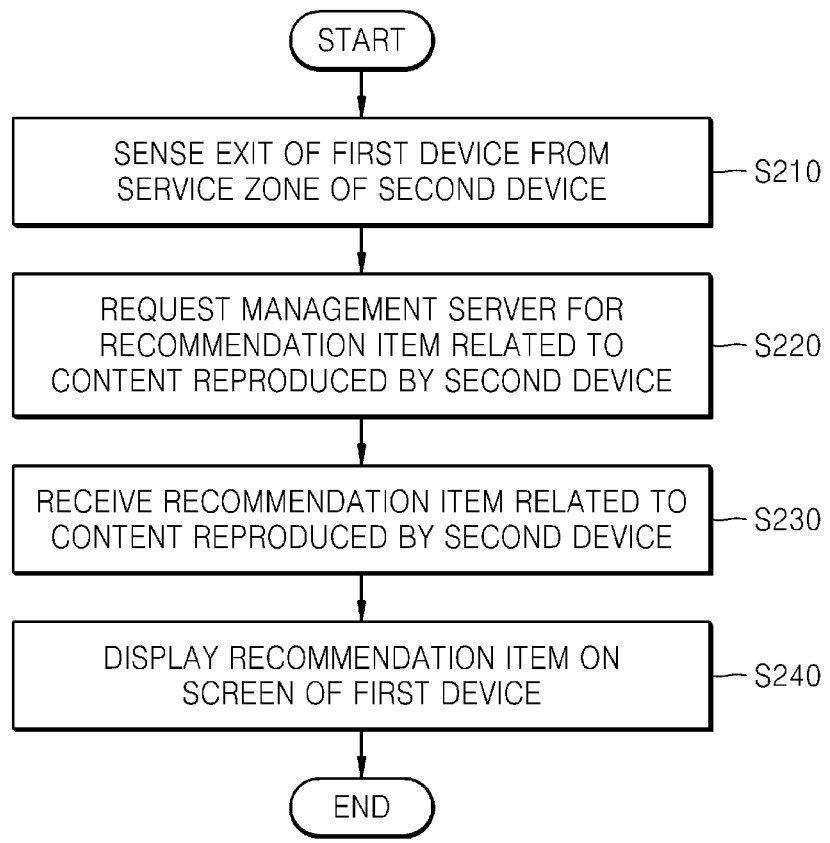
FIG. 2 is a flowchart of a method of displaying a recommendation item, the method performed by a first device, according to an exemplary embodiment.

FIG. 2 is a flowchart of a method of displaying a recommendation item, the method performed by the first device 100, according to an exemplary embodiment.

In operation S210, the first device 100 may sense an exit of the first device 100 from a service zone of the second device 200 that reproduces content. For example, in a case where a position of the first device 100 exits the service zone of the second device 200 because a user of the first device 100 moves to another location while the user carries the first device 100, the first device 100 may sense the exit from the service zone.

In the present exemplary embodiment, the service zone of the second device 200 may include a communication area where the first device 100 is able to communicate with the second device 200, a viewing area where the user of the first device 100 may directly view the content reproduced by the second device 200, or the like. In a case where the second device 200 is an advertisement panel that reproduces content in a bus, the service zone of the second device 200 may be an internal area of the bus where the user may view the content reproduced by the advertisement panel, or a communication area of the advertisement panel where the advertisement panel is able to communicate with another device.

When the communication with the second device 200 is discontinued, the first device 100 may sense the exit of the first device from the service zone of the second device 200. Here, the service zone of the second device 200 may be a communication range of the second device.

The first device 100 may be connected to an access point in the service zone of the second device 200. Here, when the user moves while carrying the first device 100, the first device 100 may sense that connection with the access point in the service zone of the second device 200 is disconnected.

In another exemplary embodiment, when the first device 100 recognizes an external device located outside, or at a boundary of the service zone of the second device 200, the first device 100 may sense the exit of the first device 100 from the service zone of the second device 200. For example, when the first device 100 receives via short-distance communication ID information of the external device or position information of the external device from the external device that is located outside the service zone of the second device 200, the first device 100 may sense the exit of the first device from the service zone of the second device 200, based on the ID information or the position information of the external device.

In the present exemplary embodiment, the external device may include, but is not limited to, a Near Field Communication (NFC) tag, a ZigBee tag, and a Bluetooth Low Energy (BLE) tag.

For example, the first device 100 may be a portable terminal of a user, the second device 200 may be a display device used in a bus, and the external device may be an NFC terminal which senses when the user of the first device is getting off the bus. Here, when the user scans the portable terminal on the NFC terminal when disembarking the bus, (that is the external device located at a boundary of a service zone of the display device), the portable terminal may recognize the NFC disembarking terminal and therefore may sense an exit of the portable terminal from the service zone of the display device in the bus.

When the first device 100 previously stores information about the service zone of the second device 200, the first device 100 may sense the exit of the first device 100 from the service zone of the second device 200, by using current position information. Here, the first device 100 may obtain the current position information by using at least one of a beacon signal-based technique using radio frequency (RF) or an infrared ray, an ultrasound-based position recognition technique, a position recognition technique using a fingerprint of a Wi-Fi signal, a ZigBee-based position recognition technique, and a global positioning system (GPS) signal-based technique.

For example, the first device 100 may sense how far (e.g., about N km) the first device 100 is from the service zone of the second device 200, by using information of Wi-Fi, GPS, a communication network base station, etc.

In the present exemplary embodiment, when the user of the first device performs a check-in operation in the service zone of the second device 200, the first device 100 may estimate a movement distance to which the first device 100 moves from a position of the check-in, by using an acceleration sensor. In the present exemplary embodiment, the check-in may mean an action in which a user intentionally leaves records about visiting a specific area or using a specific service.

In operation S220, the first device 100 may request the management server 300 for a recommendation item related to content reproduced by the second device 200. That is, when the first device 100 exits the service zone of the second device 200, the first device 100 may request the management server 300 for the recommendation item so as to recommend an item related to content reproduced by the second device 200 to the user of the first device 100.

The first device 100 may request the management server 300 for the recommendation item while the first device 100 transmits to the management server 300 information about the second device 200 and information about the service zone of the second device 200.

For example, the first device 100 may request the management server 300 for the recommendation item while the first device 100 transmits to the management server 300 at least one of position information of the first device 100, position information of the second device 200, and ID information of the second device 200. The position information of the first device 100 may include the information about the service zone of the second device 200 (e.g., an ID value for identifying the service zone).

The first device 100 may receive information about the management server 300 which is broadcast from the second device 200. The information about the management server 300 may include link information (e.g., a universal resource locator (URL)) for accessing the management server 300.

That is, the second device 200 may periodically broadcast the information about the management server 300 via short-distance communication, wherein the management server 300 may obtain the recommendation item related to the content reproduced by the second device 200. The short-distance communication may include, but is not limited to, BLE, NFC, UWB, and ANT+. Also, the second device 200 may provide the information about the management server 300 capable of obtaining the recommendation item related to the content reproduced by the second device 200, via a two-dimensional (2D) barcode (e.g., a QR barcode), a color code, a gray code, a touch code, etc. When the first device 100 exits the service zone of the second device 200, the first device 100 may request the management server 300 for the recommendation item, based on the information about the management server 300 which is received from the second device 200.

The management server 300 may define the second device 200 or the service zone of the second device 200, based on at least one of the position information of the first device 100, the position information of the second device 200, and the ID information of the second device 200. For example, when the first device 100 transmits to the management server 300 position information of the first device 100 at a point of time of the exit of the first device from the service zone of the second device, the management server 300 may define the second device 200 or the service zone of the second device 200 located within a range of the first device 100.

The management server 300 may request the second device 200 for information about the content reproduced by the second device 200, and may generate the recommendation item by using the information about the content which is received from the second device 200.

The management server 300 may transmit to the second device 200 information about a point of time when the management server 300 receives request information about the recommendation item from the first device 100. That is, the management server 300 may request the second device 200 for information about the content reproduced by the second device 200 at the point of time when the management server 300 receives the request information about the recommendation item from the first device 100.

A difference between the point of time when the management server 300 receives the request information about the recommendation item and the point of time when the first device 100 exits the service zone of the second device 200 may not be great. Thus, in the present exemplary embodiment, the point of time when the first device 100 exits the service zone of the second device 200 may correspond to a point of time when the management server 300 or the second device 200 receives a request for the recommendation item.

When the first device 100 periodically receives from the second device 200 at least one of reproduction position information (e.g., a time stamp, an index, etc.) of content that is reproduced by the second device 200 and link information of the content, the first device 100 may request the management server 300 for the recommendation item while the first device 100 transmits at least one of the reproduction position information of the content and the link information of the content to the management server 300.

The management server 300 may generate a recommendation item related to the content reproduced by the second device 200, by using the reproduction position information of the content or the link information of the content which is received from the first device 100.

In another exemplary embodiment, the management server 300 may request the second device 200 for the recommendation item related to the content reproduced by the second device 200, and may receive the recommendation item from the second device 200.

In the present exemplary embodiment, when the first device 100 senses a gesture of the user of the first device 100 that requests the recommendation item, the first device 100 may request the management server 300 for the recommendation item related to the content which is provided from the second device 200. The gesture of the user which is related to requesting the recommendation item may vary. For example, a gesture in which a specific button (a home button, a power button, etc.) is pressed over a predetermined time period, a gesture in which a specific area of a screen is touched, or the like.

When the gesture of the user which requests the recommendation item is sensed, although the device 100 is located in the service zone of the second device 200, the first device may request the management server 300 for the recommendation item.

In operation S230, the first device 100 may receive the recommendation item related to the content from the management server 300. In the present exemplary embodiment, the first device 100 may receive the recommendation item related to the content from the management server 300. Here, in the present exemplary embodiment, the first device 100 may receive the recommendation item that is generated by the management server 300. In another exemplary embodiment, the first device 100 may receive from the management server 300 a recommendation item that is generated by the second device 200.

In the present exemplary embodiment, the recommendation item may include, but is not limited to, an application item, a resume item, an additional information item, and an advertisement item that correspond to the content.

The application item may be an item related to an application which accesses a content provider that provides the content reproduced by the second device 200.

The resume item may be an item for allowing the content that was reproduced by the second device 200 to be reproduced by the first device 100 after the point of time when the first device 100 exits the service zone of the second device 200.

The additional information item may be an item for providing a plurality of pieces of additional information (e.g., in a case of movie content, an introduction of cast and crew, a synopsis, grades, a preview, original soundtrack (OST) information, etc.) related to the content reproduced by the second device 200. The advertisement item may be an item for inducing the user to purchase the content or an additional service related to the content.

In operation S240, the first device 100 may display the recommendation item related to the content on a screen of the first device 100.

The screen of the first device 100 may include, but is not limited to, a first screen that is first displayed on the first device 100 when an operation mode of the first device 100 is switched from a standby mode to an active mode (e.g., when the first device 100 is unlocked, power of the first device 100 is on, or the like). For example, the first device 100 may display the recommendation item on a specific page of a plurality of pages having icons arrayed thereon, or may display the recommendation item on a predetermined area of a background screen.

When the recommendation item includes a plurality of recommendation items, the first device 100 may display a list of the recommendation items on the screen.

The recommendation item displayed on the first device 100 may be configured of an image of the content, and link information or index information each of which is connected to the image. For example, the recommendation item may be formed in a manner that a captured image of the content reproduced by the second device 200 at the point of time when the first device 100 exits the service zone of the second device 200 (hereinafter, a 'last screen image') is connected with reproduction position information indicating a reproduction position of the content at the point of time when the first device 100 exits the service zone of the second device.

The reproduction position information may include link information (e.g., a URL) for accessing the content reproduced by the second device 200 at the point of time when the first device 100 exits the service zone of the second device, index information (e.g., a uniform resource identifier (URI)) for accessing still image content displayed by the second device 200 at the point of time when the first device 100 exits the service zone of the second device, or the like.

In another exemplary embodiment, the recommendation item may be configured of a text indicating the content and the reproduction position information that is connected to the text. The text may be provided by a content provider.

In the present exemplary embodiment, the management server 300 may transmit the recommendation item related to the content to a cloud server that is connected to the first device 100. In this case, when required, the first device 100 may receive the recommendation item from the cloud server and may display the recommendation item on the screen.

When the first device 100 exits the service zone of the second device 200, the user of the first device 100 may no longer view the content reproduced by the second device 200, so that the first device 100 displays the recommendation item on the screen so as to recommend, to the user, information related to the content reproduced by the second device 200. This is described in detail with reference to FIG. 3.

Figure 3:
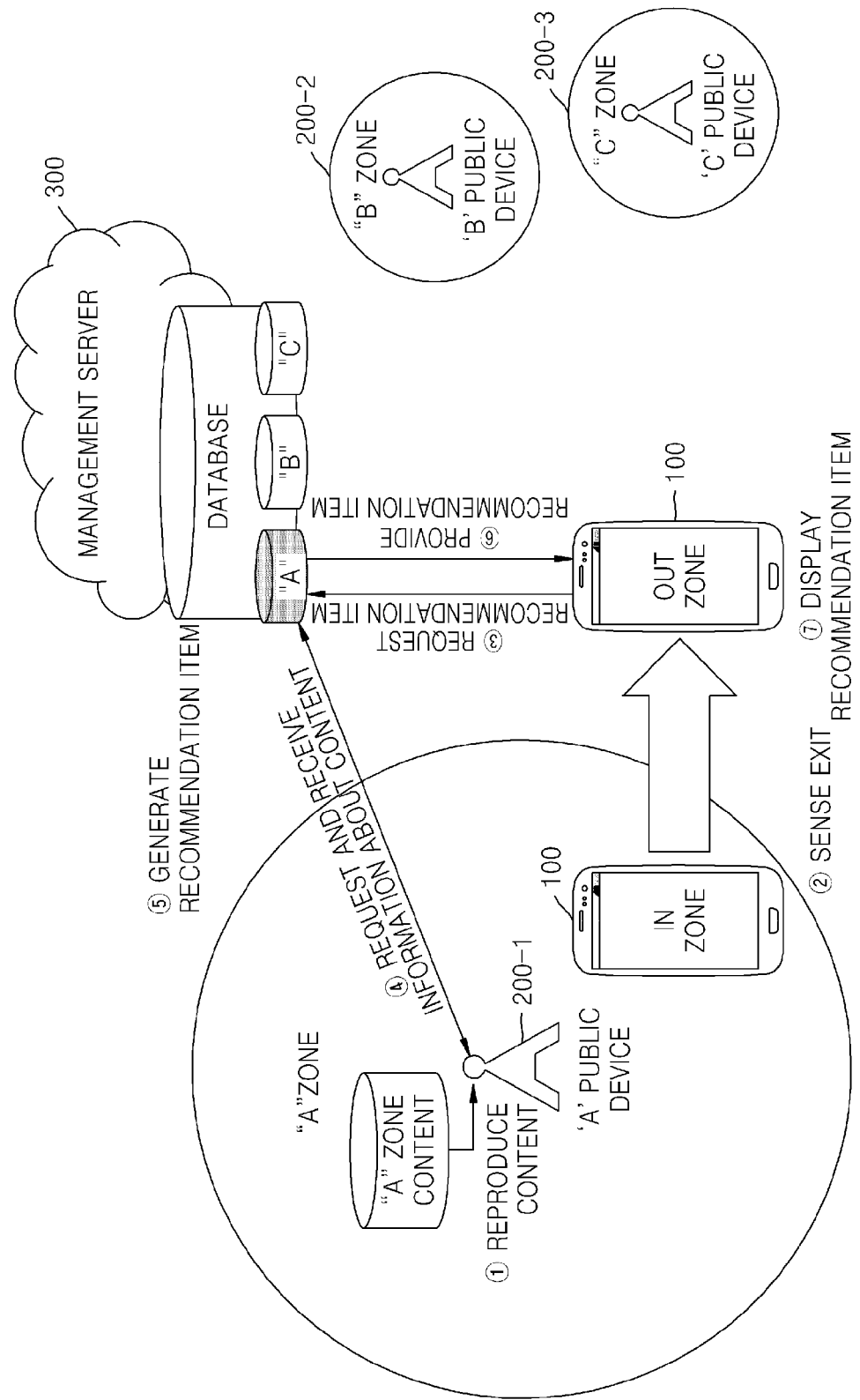
FIG. 3 illustrates a method of displaying a recommendation item, the method performed by the first device, according to another exemplary embodiment.

FIG. 3 illustrates a method of displaying a recommendation item, the method performed by the first device 100, according to another exemplary embodiment. In the exemplary embodiment of FIG. 3, it is assumed that the first device 100 is a personal mobile device and the second device 200 is a public device.

An 'A' public device 200-1 may reproduce animation content (operation 1). Here, a user of the first device 100 in a service zone of the 'A' public device 200-1 may view the animation content reproduced by the 'A' public device 200-1. When the user of the first device 100 stays in the service zone of the 'A' public device 200-1 over a predetermined time period and then exits the service zone, the user of the first device 100 may no longer view the animation content reproduced by the 'A' public device 200-1.

Thus, when the first device 100 senses the exit of the first device 100 from the service zone of the 'A' public device 200-1 (operation 2), the first device 100 may request the management server 300 for a recommendation item related to the animation content reproduced by the 'A' public device 200-1 (operation 3). The operation 2, in which the first device 100 senses the exit from the service zone of the 'A' public device 200-1, corresponds to operation S210 of the exemplary embodiment shown FIG. 2, and thus, the detailed descriptions thereof are omitted here.

The management server 300 may have a database about service zones of the second device 200. Thus, when the management server 300 receives a request for the recommendation item from the first device 100, the management server 300 may define the 'A' public device 200-1 as the second device 200, based on a position of the first device 100.

The management server 300 may request the 'A' public device 200-1 for information about the animation content reproduced by the 'A' public device 200-1 at a point of time when the first device 100 exits the service zone of the 'A' public device 200-1 (or when the management server 300 receives the request for the recommendation item from the first device 100). Here, in response to the request from the management server 300, the 'A' public device 200-1 may transmit to the management server 300 at least one of an image of the animation content reproduced by the 'A' public device 200-1 at the point of time when the first device 100 exits the service zone of the 'A' public device 200-1 (or when the management server 300 receives the request for the recommendation item from the first device 100), reproduction position information (e.g., link information or index information) of the content reproduced by the 'A' public device 200-1 at the point of time when the first device 100 exits the service zone of the 'A' public device 200-1 (or when the management server 300 receives the request for the recommendation item from the first device 100), application information corresponding to the content reproduced by the 'A' public device 200-1 at the point of time when the first device 100 exits the service zone of the 'A' public device 200-1 (or when the management server 300 receives the request for the recommendation item from the first device 100), additional information, and advertisement information related to content reproduced by the 'A' public device 200-1 at the point of time when the first device 100 exits the service zone of the 'A' public device 200-1 (or when the management server 300 receives the request for the recommendation item from the first device 100) (operation 4).

The 'A' public device 200-1 may transmit to the management server 300 a captured image (i.e., a last screen image) of a screen reproducing the content at the point of time when the first device 100 exits the service zone of the 'A' public device 200-1 (or when the management server 300 receives the request for the recommendation item from the first device 100).

The management server 300 may generate the recommendation item by using a plurality of pieces of information received from the 'A' public device 200-1 (operation 5). For example, the management server 300 may generate a resume item as the recommendation item by using information received from the 'A' public device 200-1, i.e., by using the captured image (i.e., the last screen image) and the reproduction position information of the content that is reproduced at the point of time when the first device 100 exits the service zone of the 'A' public device 200-1. Also, the management server 300 may generate an additional information item by using the additional information received from the 'A' public device 200-1, or may generate an application item by using the application information received from the 'A' public device 200-1. Here, the management server 300 may generate the recommendation item in the form of an object (e.g., a gadget) for using a service, or in the form of a list.

The management server 300 may provide the recommendation item to the first device 100 (operation 6). The first device 100 may display the recommendation item received from the management server 300 on a screen (e.g., a first screen) (operation 7).

Thus, according to the present exemplary embodiment, when the user of the first device 100 views content reproduced by a public device and then exits a service zone of the public device, the first device 100 may provide to the user a recommendation item (e.g., a resume item) related to the content reproduced by the public device, so that, although the user exits the service zone of the public device, the user may continuously use a service provided by the public device.

Hereinafter, when the first device 100 performs a context analysis and recognizes that the user of the first device 100 has a high interest level with regard to content reproduced by the second device 200, a method of displaying a recommendation item on a screen of the first device 100, the method performed by the first device 100, will now be described.

Figure 4:
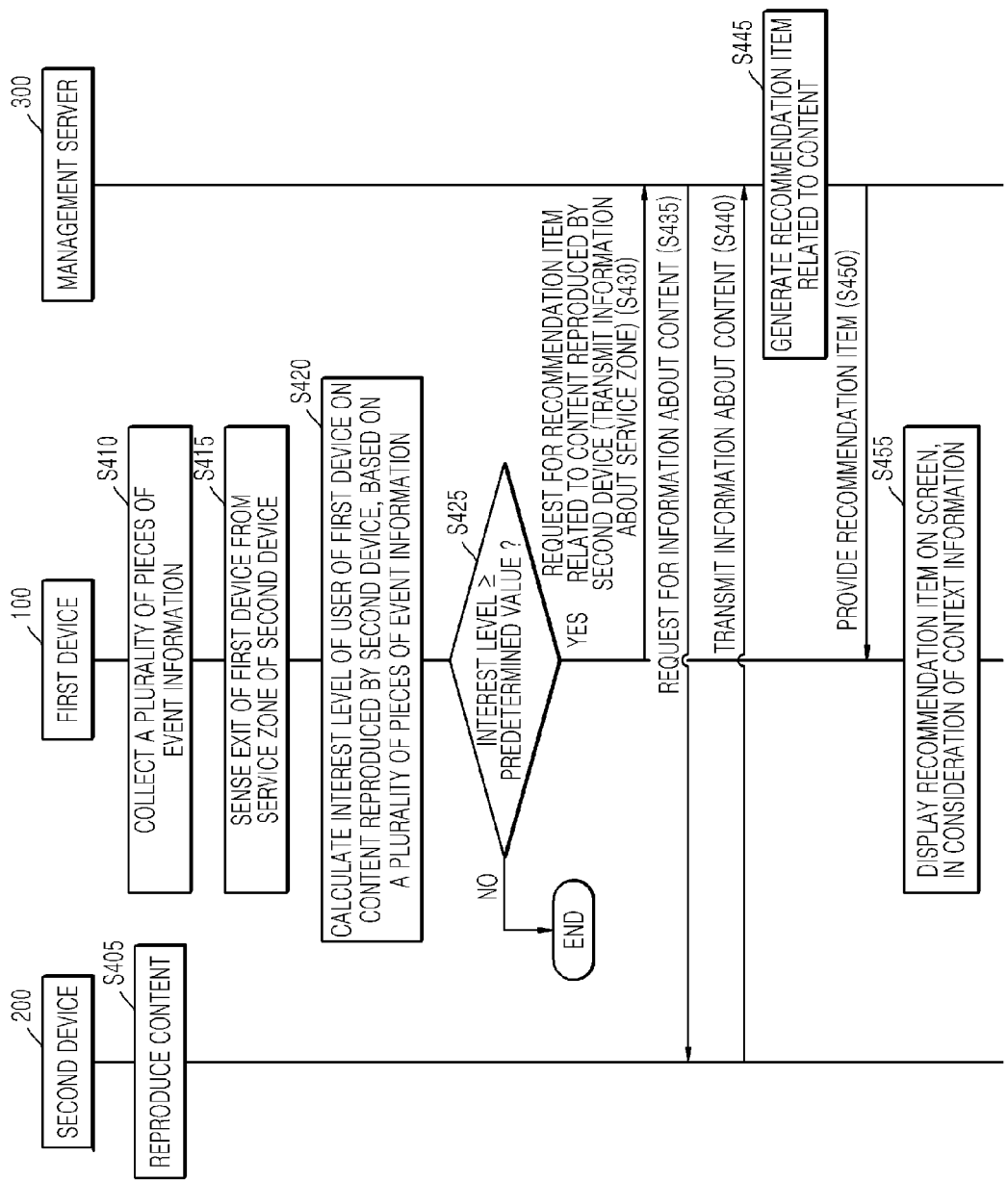
FIG. 4 is a flowchart of a method of displaying a recommendation item after the first device performs a context analysis, the method performed by the first device, according to an exemplary embodiment.

FIG. 4 is a flowchart of a method of displaying a recommendation item after the first device 100 performs a context analysis, the method performed by the first device 100, according to an exemplary embodiment.

In operation S405, the second device 200 may reproduce content. The content may include, but is not limited to, education content, movie content, broadcasting content, game content, advertisement content, still image content, and news content.

In operation S410, the first device 100 may collect event information about an event that occurs in the first device 100. That is, the first device 100 may sense various types of events occurring in the first device 100 and may collect a plurality of pieces of event information about the various types of sensed events.

For example, the first device 100 may collect position information, or network information (e.g., a GPS-coordinates information, cell-ID information, Wi-Fi access point information, or the like) which is of the first device 100.

Also, the first device 100 may collect state information about a state of a user of the first device 100. The state information of the user may indicate movement, a life pattern, etc. of the user, and may include a plurality of pieces of information about a walking state, an exercising state, a driving state, a sleeping state, etc. of the user. For example, when the user connects the first device 100 to a stand in a house, the first device 100 may determine that the user is in a sleeping state, in consideration of position information, tilt information, movement information, current time information, alarm setting information, etc. of the first device 100 Also, when the user connects the first device 100 to a stand in a car, the first device 100 may determine that the user is in the driving state, in consideration of position information, tilt information, movement information, etc. of the first device 100.

The first device 100 may collect contents that are input via a user input device. For example, the first device 100 may collect a plurality of pieces of information about texts, drawings, symbols, etc. that are input by a user via a touch screen, or may recognize a voice of the user and may collect vocal contents input by the user.

The first device 100 may collect exchanged message information, exchanged email information, call history information, social network service (SNS) use information, and webpage use information. For example, the first device 100 may collect transmission and reception times of messages or emails, contents included in exchanged messages or emails, call contents, a call time, caller or receiver information, an SNS server access time, an SNS use history, information received from an SNS server, a webpage access time, a webpage use history, or the like.

The first device 100 may collect a plurality of pieces of use information regarding applications in the first device 100. For example, when the user executes and uses a housekeeping book application, the first device 100 may collect a plurality of pieces of use information about expenses, incomes, investments, etc., that are recorded to a housekeeping book, or when the user executes a schedule management application and inputs a schedule, the first device 100 may collect schedule information of the user. Also, when the user executes a capture application and captures content, the first device 100 may collect content information about the captured content, or when the user executes a music reproduction application and reproduces music, the first device 100 may collect music information about the music reproduced by the user.

The first device 100 may collect ID information, type information, use time information, use period information, etc. about applications that the user installed, uses, or searches for. Also, when the user performs a transaction by using a mobile card in the first device 100, the first device 100 may collect transaction information, purchase pattern information, etc., about the user.

That is, the first device 100 may collect via various sensors the plurality of pieces of event information about the events occurring in the first device 100, a plurality of pieces of information about the user of the first device 100, or the like. Here, the first device 100 may periodically collect the plurality of pieces of event information or may collect event information in real-time when a specific event occurs.

The first device 100 may collect the plurality of pieces of event information via an SSP, and therefore may significantly decrease power consumption for collecting the plurality of pieces of event information.

In operation S415, the first device 100 may sense an exit of the first device 100 from a service zone of the second device 200. The first device 100 may sense the exit from the service zone of the second device 200 by using the plurality of pieces of event information.

For example, when communication connection with the second device 200 is discontinued, the first device 100 may sense the exit of the first device from the service zone of the second device 200.

Also, when the first device 100 recognizes an external device (e.g., an NFC tag, a BLE tag, etc.) located outside of the service zone of the second device 200, or at a boundary of the service zone of the second device 200, the first device 100 may sense the exit of the first device from the service zone of the second device 200.

When the first device 100 previously stores information about the service zone of the second device 200, the first device 100 may sense the exit of the first device from the service zone of the second device 200, by using current position information. Operation S415 corresponds to operation S210, thus, detailed descriptions thereof are omitted here.

In operation S420, the first device 100 may calculate an interest level of the user of the first device 100 with regard to the content reproduced by the second device 200, based on the plurality of pieces of event information. The first device 100 may calculate the interest level of the user of the first device 100 with regard to the content reproduced by the second device 200, based on input information of the user, state information of the user, the current position information, reservation history information, etc.

For example, when the user of the first device 100 performs a check-in operation with respect to the second device 200 or the service zone of the second device 200 by using the first device 100, the first device 100 may calculate a high interest level of the user of the first device 100 for the content reproduced by the second device 200.

The first device 100 may calculate a probability that the user of the first device 100 might view the content reproduced by the second device 200, and therefore may calculate the interest level of the user of the first device 100.

Here, the first device 100 may calculate the probability that the user of the first device 100 might view the content reproduced by the second device 200, based on the state information of the user, the current position information, application information about an application executed in the first device 100, or the like.

For example, when the user of the first device 100 downloads to the first device 100 data that is provided by the second device 200, or inputs recommendation information to the first device 100 so as to recommend the content reproduced by the second device 200 to another user via an SNS, the first device 100 may calculate a high probability (e.g., about 95%) that the user of the first device 100 might view the content reproduced by the second device 200.

Also, when the user of the first device 100 stays in the service zone of the second device 100 over a predetermined time period and, while the user of the first device 100 stays in the service zone, if the user of the first device 100 manipulates the first device 100 by a number of times or for a time period that are less than a predetermined reference value, the probability that the user of the first device 100 might view the content reproduced by the second device 200 may be high.

That is, when a position of the first device 100 is not changed in the service zone of the second device 100 over the predetermined time period, and the first device 100 does not sense an input of the user over a predetermined time period, the first device 100 may calculate a high probability (e.g., about 90%) that the user of the first device 100 might wish to view the content reproduced by the second device 200.

Although the first device 100 is positioned in the service zone of the second device 100 over the predetermined time period, while the first device 100 is positioned in the service zone of the second device 100, if the first device 100 receives from the user of the first device 100 an execution request with respect to an application that is irrelevant to the content reproduced by the second device 200, the first device 100 may calculate a low probability (e.g., about 30%) that the user of the first device 100 might wish to view the content reproduced by the second device 200. Here, the second device 200 may broadcast information about the content reproduced by the second device 200.

In the present exemplary embodiment, the first device 100 may sense the user's eyes via a camera and therefore may calculate a probability that the user of the first device 100 might view the content reproduced by the second device 200.

For example, as a result of sensing the user's eyes, if the user keeps staring at a screen of the first device 100, the first device 100 may calculate a low probability (e.g., about 10%) that the user of the first device 100 might view the content reproduced by the second device 200. On the other hand, as the result of sensing the user's eyes, if the user does not stare at the screen of the first device 100, the first device 100 may calculate a probability of at least 70% that the user of the first device 100 might view the content reproduced by the second device 200.

In a case where the user of the first device 100 purchased a movie ticket by using the first device 100, and the first device 100 is positioned in a theater at a time when a movie corresponding to the movie ticket is shown, the first device 100 may calculate a high probability (e.g., about 98%) that the user of the first device 100 might view the movie reproduced by the second device 200 (e.g., a movie screening apparatus).

For example, in a case where the user booked a movie ticket of a particular movie to be shown in a particular theater at 5 p.m. on Mar. 1, 2013, by using the first device 100, or the user downloaded the purchased movie ticket from a server, the first device 100 may collect and analyze information regarding an event related to the purchasing of the movie ticket. Then, when the first device exits the particular theater at 6:30 p.m. on Mar. 1, 2013, the first device 100 may calculate a high probability (e.g., about 99.9%) that the user of the first device 100 views the particular movie. According to the present exemplary embodiment, the first device 100 may analyze event information collected based on ontology, and thus may obtain information about an interest level of the user of the first device 100 with regard to the content reproduced by the second device 200.

Ontology means formal and explicit specification about shared conceptualization. Ontology may mean a type of dictionary consisting of words and relations therebetween, in which words related to a specific domain are hierarchically expressed and a logical rule for an additional extension exists therein.

In the present exemplary embodiment, the first device 100 may analyze a text or voice which is input from the user, based on ontology. That is, the first device 100 may obtain information about correlation between the text/voice input from the user and the content reproduced by the second device 200, based on ontology. Here, the second device 200 may broadcast information about the content reproduced by the second device 200. Based on the information about the correlation between the text/voice input from the user and the content reproduced by the second device 200, the first device 100 may calculate the interest level of the user of the first device 100 with regard to the content reproduced by the second device 200.

For example, the second device 200 may show an particular animation and the first device 100 may receive information (e.g., a content type, a content title, a reproduction position of content, scene information, etc.) about the particular animation from the second device 200. Here, the first device 100 may extract keywords after analyzing a voice of the user which is obtained via a microphone, and may calculate a correlation between the extracted keywords and a plurality of pieces of information about the particular animation that are received from the second device 200, based on ontology.

If the user of the first device 100 frequently mentions words related to the particular animation while the user talks with a friend directly or on a telephone call, the first device 100 may determine that the user has a high interest level in the particular animation reproduced by the second device 200.

In operation S425, the first device 100 may determine whether the interest level of the user of the first device 100 in the content reproduced by the second device 200 is equal to or greater than a predetermined value (e.g., whether a probability that the user of the first device 100 might view the content reproduced by the second device 200 is equal to or greater than 85%). The predetermined value may be set in the first device 100, may be set by the user, or may be set by the management server 300.

In the present exemplary embodiment, the first device 100 in a predetermined context may estimate, without calculating the interest level, that the interest level of the user of the first device 100 in the content reproduced by the second device 200 is equal to or greater than the predetermined value.

For example, when the first device 100 has a purchase history of a view ticket with respect to the content reproduced by the second device 200, or has a check-in history with respect to the service zone of the second device 200, the first device 100 may determine that the interest level of the user of the first device 100 on the content reproduced by the second device 200 is equal to or greater than the predetermined value.

That is, when the user of the first device 100 intentionally purchased the ticket to view particular content, the first device 100 may analyze that the interest level of the user of the first device 100 on the content reproduced by the second device 200 is high. Thus, the first device 100 may not particularly calculate the probability that the user of the first device 100 might view the content reproduced by the second device 200.

In operation S430, when the interest level of the user of the first device 100 in the content reproduced by the second device 200 is equal to or greater than the predetermined value, the first device 100 may request the management server 300 for a recommendation item related to the content reproduced by the second device 200. For example, when the interest level of the user of the first device 100 in the content reproduced by the second device 200 is equal to or greater than 85%, the first device 100 may request the management server 300 for the recommendation item.

The first device 100 may request the recommendation item while the first device 100 transmits to the management server 300 at least one of position information of the first device 100, position information of the second device 200, ID information of the second device 200, reproduction position information of the content, and link information of the content.

When the interest level of the user of the first device 100 on the content reproduced by the second device 200 is less than the predetermined value, the first device 100 may not request the management server 300 for the recommendation item.

In operation S435, in order to generate the recommendation item, the management server 300 may request the second device 200 for information about the content reproduced by the second device 200 at a point of time when the first device 100 exits the service zone.

In operation S440, in response to the request from the management server 300, the second device 200 may transmit to the management server 300 the information about the content that is reproduced at the point of time when the first device 100 exits the service zone.

For example, the second device 200 may capture a screen that reproduces the content at the point of time when the first device 100 exits the service zone, and may transmit the captured image (i.e., a last screen image) to the management server 300. Also, the second device 200 may transmit to the management server 300 at least one of reproduction position information (e.g., link information or index information) of the content reproduced by the second device 200 at the point of time when the first device 100 exits the service zone of the second device 200, application information corresponding to the content reproduced by the second device 200 at the point of time when the first device 100 exits the service zone of the second device 200, additional information, and advertisement information related to content reproduced by the second device 200 at the point of time when the first device 100 exits the service zone of the second device 200.

In operation S445, the management server 300 may generate the recommendation item related to the content. For example, the management server 300 may generate a resume item as the recommendation item by using the captured image (i.e., the last screen image) and the reproduction position information (e.g., the link information or the index information) that are received from the second device 200. Also, the management server 300 may generate an additional information item by using the additional information received from the second device 200, or may generate an application item by using the application information received from the second device 200. Here, the management server 300 may generate the recommendation item in the form of an object (e.g., a gadget) for using a service, or in the form of a list.

In operation S450, the management server 300 may provide the recommendation item to the first device 100. According to the present exemplary embodiment, the management server 300 may provide the recommendation item to the first device 100 via wired or wireless communication.

In operation S455, the first device 100 may display the recommendation item on a screen. Here, the first device 100 may display the recommendation item on the screen, in consideration of context information of the user.

For example, when the first device 100 senses a gesture of the user of the first device 100 that requests the recommendation item, the first device 100 may display the recommendation item on the screen. The gesture of the user which is related to requesting the recommendation item may vary.

Also, the first device 100 may display the recommendation item on the screen, based on luminance information, tilt information, etc. For example, when a luminance of the first device 100 is less than a predetermined value, the first device 100 may not display the recommendation item on the screen, and when the luminance of the first device 100 is equal to or greater than the predetermined value, the first device 100 may display the recommendation item on the screen.

That is, in a case where the user of the first device 100 keeps the first device 100 in the user's pocket or does not carry the first device 100 in the user's hand, it may mean that the user may not have an intention to receive the recommendation item. Thus, the first device 100 may not display the recommendation item on the screen, based on the luminance information or the tilt information.

On the other hand, when the first device 100 exits the service zone of the second device 200, if the user of the first device 100 stares at the screen while the user holds the first device 100 in the user's hand, the first device 100 may display on the screen the recommendation item related to the content reproduced by the second device 200.

Thus, according to the present exemplary embodiment, the first device 100 considers the context information of the user and therefore, when the user does not want the recommendation item or cannot view the recommendation item, the first device 100 may not display the recommendation item on the screen.

The first device 100 may display the recommendation item according to a user-designated setting. For example, the first device 100 may provide the recommendation item in the form of a pop-up window or may display the recommendation item on a specific page.

The first device 100 may scan the service zone of the second device 200 that the first device 100 previously visited, and the scan may be performed within a predetermined range with respect to a current position. When the service zone of the second device 200 that the first device 100 previously visited is scanned, the first device 100 may extract a recommendation item related to content that was previously reproduced by the second device 200 and may display the recommendation item on the screen.

For example, in a case where a gallery that the user of the first device 100 visited one month ago is located in a building next to a department store where the first device 100 is currently positioned, the first device 100 may extract a recommendation item related to content that the user viewed in the gallery one month ago and may display the recommendation item on the screen.

That is, according to the present exemplary embodiment, in a case where a service zone that the user previously visited is located adjacent to the user, and the user viewed content in the service zone, the first device 100 may provide a recommendation item related to the content that the user viewed.

Operation S455 corresponds to operation S240 shown in FIG. 2 and thus repeated detailed descriptions thereof are omitted here.

According to the present exemplary embodiment, the first device 100 may perform the context analysis and therefore may provide to the user a recommendation item related to content having a high probability that the user might view from among a plurality of pieces of content that are reproduced by a public device. Thus, it is possible to prevent many unnecessary recommendation items from being provided to the user via the first device 100.

In another exemplary embodiment, an order of operations S405 through S455 may be changed or some operations may be skipped.

Figure 5:
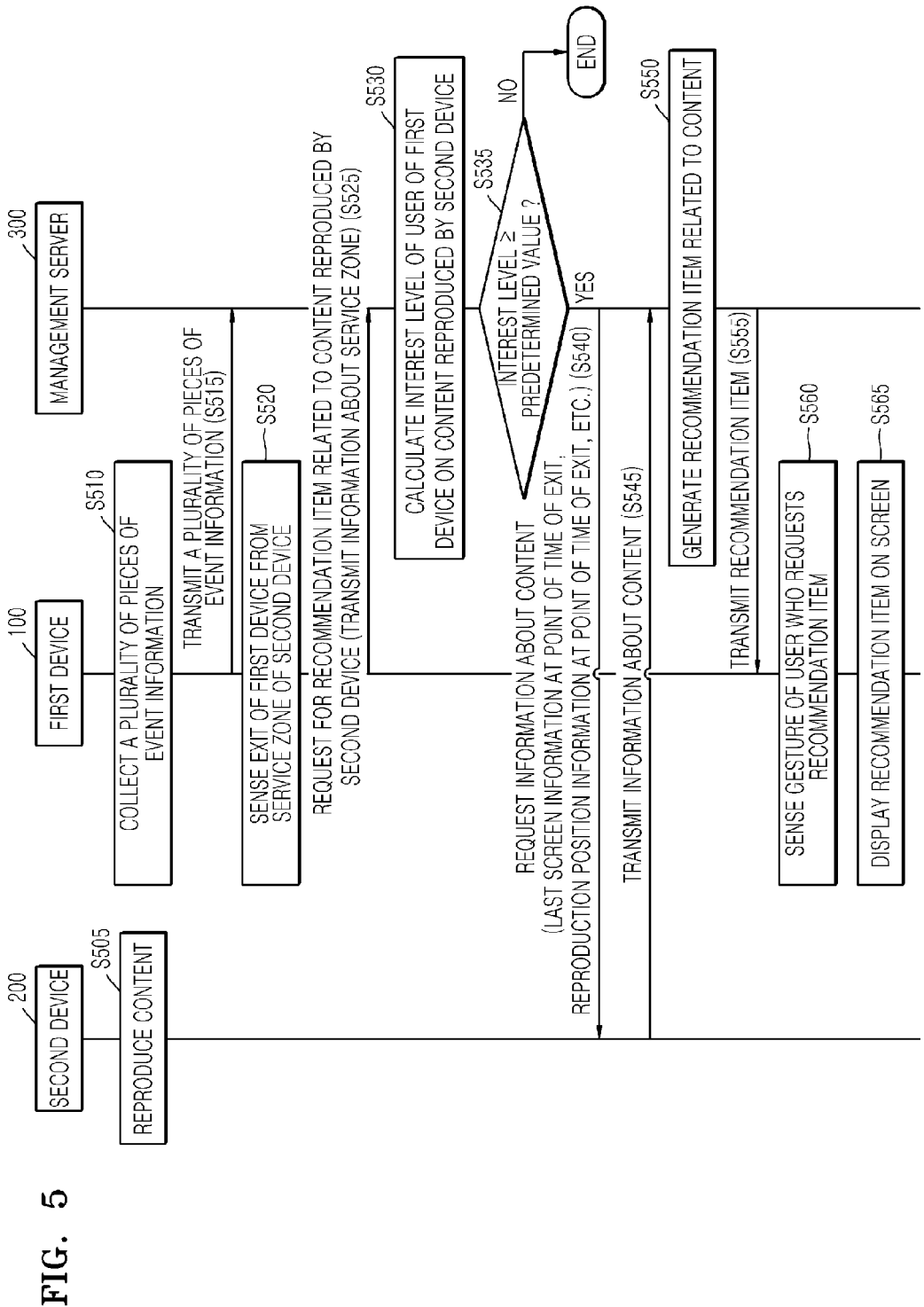
FIG. 5 is a flowchart of a method of providing a recommendation item, the method performed by a management server, according to an exemplary embodiment.

FIG. 5 is a flowchart of a method of providing a recommendation item, the method performed by the management server 300, according to an exemplary embodiment.

In operation S505, the second device 200 may reproduce content. Here, the first device 100 may be positioned in a service zone of the second device 200.

In operation S510, the first device 100 may collect event information about an event that occurs in the first device 100. That is, the first device 100 may sense various types of events occurring in the first device 100 and may collect a plurality of pieces of event information about the various types of sensed events. For example, the first device 100 may collect position information, network information, user's state information, exchanged message information, exchanged email information, call history information, SNS use information, application use information, and webpage use information, transaction information, etc. of the first device 100.

In operation S515, the first device 100 may transmit the plurality of pieces of event information to the management server 300. The first device 100 may transmit all or some of the plurality of pieces of event information to the management server 300. For example, the first device 100 may not transmit to the management server 300 a plurality of pieces of personal financial information (e.g., a bank account, a credit card number, etc.) that are input by the user.

The first device 100 may periodically transmit the plurality of pieces of event information to the management server 300 or may transmit event information to the management server 300 when a specific event occurs. The first device 100 may encrypt the event information by using a pre-agreed encryption code and then may transmit the encrypted event information to the management server 300.

In operation S520, the first device 100 may sense an exit of the first device 100 from the service zone of the second device 200. Here, in operation S525, the first device 100 may request the management server 300 for a recommendation item related to the content reproduced by the second device 200. That is, when the first device 100 exits the service zone of the second device 200 that reproduces the content, the management server 300 may receive a request for the recommendation item from the first device 100.

In operation S530, the management server 300 may calculate an interest level of the user in the content reproduced by the second device 200. For example, when the user of the first device 100 performs a check-in procedure with respect to the second device 200 or the service zone of the second device 200 by using the first device 100, the management server 300 may receive check-in information from the first device 100. Here, the management server 300 may calculate a high interest level of the user of the first device 100 in the content reproduced by the second device 200.

The management server 300 may calculate a probability that the user of the first device 100 might view the content reproduced by the second device 200, based on the plurality of pieces of event information collected by the first device 100, and therefore may calculate the interest level of the user of the first device 100 in the content reproduced by the second device 200.

Here, the management server 300 may calculate the probability that the user of the first device 100 might view the content reproduced by the second device 200, based on input information of the user, state information of the user, the current position information, reservation history information, etc. that are received from the first device 100.

For example, when the management server 300 receives a plurality of pieces of event information about events in which the user of the first device 100 downloads to the first device 100 data that is provided by the second device 200, or inputs recommendation information to the first device 100 so as to recommend the content reproduced by the second device 200 to another user, then the management server 300 may calculate a high probability (e.g., about 95%) that the user of the first device 100 might view the content reproduced by the second device 200.

Also, when a position of the first device 100 is not changed in the service zone of the second device 200 over the predetermined time period, and an input of the user is not sensed over a predetermined time period, the management server 300 may calculate a high probability (e.g., about 90%) that the user of the first device 100 might view the content reproduced by the second device 200.

Although the first device 100 is positioned in the service zone of the second device 200 during the predetermined time period, while the first device 100 is positioned in the service zone of the second device 200, if the user of the first device 100 performs, by using the first device 100, an operation that is irrelevant to the content reproduced by the second device 200, the management server 300 may calculate a low probability (e.g., about 30%) that the user of the first device 100 might view the content reproduced by the second device 200.

In a case where the user of the first device 100 purchased a movie ticket by using the first device 100, and the first device 100 is positioned in a theater at a time when a movie corresponding to the purchased movie ticket is shown, the management server 300 may calculate a high probability (e.g., about 98%) that the user of the first device 100 might view the movie reproduced by the second device 200 (e.g., a movie screening apparatus).

In the present exemplary embodiment, the management server 300 may calculate a probability that the user of the first device 100 might view the content reproduced by the second device 200, based on information that is obtained by the first device 100 by sensing the user's eyes via a camera.

According to the present exemplary embodiment, the management server 300 may analyze event information collected by the first device 100 based on ontology, and thus may obtain information about an interest level of the user of the first device 100 on the content reproduced by the second device 200.

For example, the management server 300 may obtain information about a correlation between text/voice inputs by the user and the content reproduced by the second device 200, based on ontology. Based on the information about the correlation between the text/voice inputs by the user and the content reproduced by the second device 200, the management server 300 may calculate the interest level of the user of the first device 100 on the content reproduced by the second device 200.

In operation S535, the management server 300 may determine whether the interest level of the user of the first device 100 in the content reproduced by the second device 200 is equal to or greater than a predetermined value (e.g., whether a probability that the user of the first device 100 might view the content reproduced by the second device 200 is equal to or greater than 85%). The predetermined value may be set by the user or by the management server 300.

In the present exemplary embodiment, the management server 300 in a predetermined context may estimate (or may determine), without calculating the interest level, that the interest level of the user of the first device 100 in the content reproduced by the second device 200 is equal to or greater than the predetermined value.

For example, when the user of the first device 100 has a history of purchasing a ticket to view the content reproduced by the second device 200, or has a check-in history with respect to the service zone of the second device 200, the management server 300 may determine that the interest level of the user of the first device 100 in the content reproduced by the second device 200 is equal to or greater than the predetermined value.

In operation S540, when the interest level of the user of the first device 100 in the content reproduced by the second device 200 is equal to or greater than the predetermined value, the management server 300 may request the second device 200 for information about the content reproduced by the second device 200. Here, the management server 300 may transmit to the second device 200 information about a point of time when the first device 100 exits the service zone of the second device 200.

In operation S545, the management server 300 may receive the information about the content from the second device 200. For example, the management server 300 may receive from the second device 200 at least one of captured image information obtained by capturing an image of the content reproduced by the second device 200 at the point of time when the first device 100 exits the service zone of the second device 200, reproduction position information of the content reproduced by the second device 200 at the point of time when the first device 100 exits the service zone of the second device 200, application information corresponding to the content, additional information about the content, and advertisement information corresponding to the content.

In operation S550, the management server 300 may generate a recommendation item related to the content reproduced by the second device 200 at the point of time when the first device 100 exits the service zone of the second device 200, based on the information about the content which is received from the second device 200.

For example, the management server 300 may generate a resume item by using the captured image information obtained by capturing the image of the content reproduced by the second device 200 at the point of time when the first device 100 exits the service zone of the second device, and the reproduction position information (e.g., a time stamp, index information, etc.) about the content reproduced by the second device 200 at the point of time when the first device 100 exits the service zone of the second device.

In operation S555, the management server 300 may transmit the generated recommendation item to the first device 100. Here, in the present exemplary embodiment, the first device 100 may store the recommendation item in its memory.

In operation S560, the first device 100 may sense a gesture of the user of the first device 100 that requests the recommendation item. For example, the first device 100 may sense the gesture in which the user presses a specific button (e.g., a home button), touches a specific area of a screen, unlocks a lock of the device, or the like.

In operation S565, when the first device 100 senses the gesture of the user who requests the recommendation item, the first device 100 may display on the screen the recommendation item that is received from the management server 300. The screen may be a first screen.

In another exemplary embodiment, an order of operations S505 through S565 may be changed or some operations may be skipped. For example, in other exemplary embodiments, operations S530 and S535 may be performed after operation S545 or after operation S550.

Hereinafter, a method of receiving a recommendation item from the second device 200 without using the management server 300 and displaying the recommendation item on a predetermined screen, the method performed by the first device 100, will be described in detail with reference to FIGS. 6 through 8.

Figure 6:
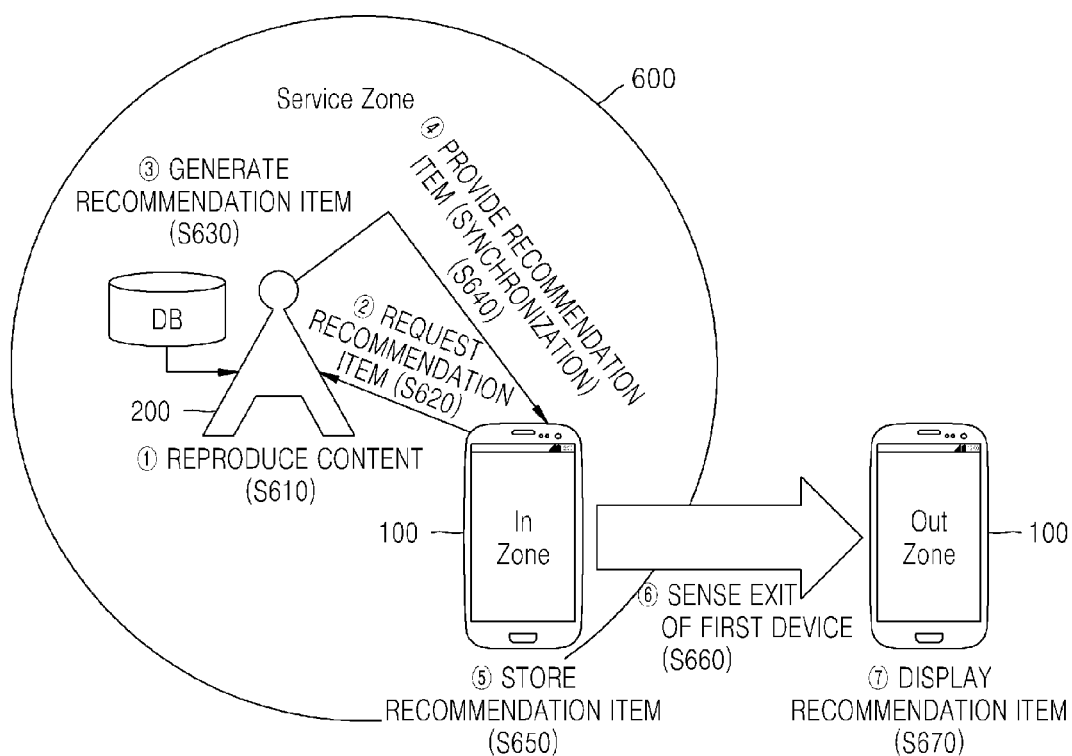
FIG. 6 is a flowchart of a method of displaying a recommendation item, the method performed by the first device, according to another exemplary embodiment.

FIG. 6 is a flowchart of a method of displaying a recommendation item, the method performed by the first device 100, according to another exemplary embodiment.

In operation S610, the second device 200 may reproduce content. Here, the first device 100 may be positioned in a service zone 600 of the second device 200. In the present exemplary embodiment, the service zone 600 includes a communication area where the first device 100 is able to communicate with the second device 200, or a viewing area where the user of the first device 100 may directly view the content reproduced by the second device 200.

In operation S620, the first device 100 may request the second device 200 for a recommendation item related to the content reproduced by the second device 200. Here, the first device 100 may request the second device 200 for the recommendation item, provided that the first device 100 is positioned in the service zone 600 of the second device 200 for a predetermined time period (e.g., 5 minutes).

For example, when the first device 100 receives via short-distance communication a signal that is broadcast from the second device 200 over a predetermined time period, the first device 100 may request the second device 200 for the recommendation item related to the content reproduced by the second device 200. Additionally, when the first device 100 recognizes an NFC terminal which senses the first device, and allows a user of the first device to board a bus, and then a predetermined time period (e.g., 3 minutes) elapses, the first device 100 may request the second device 200 for a recommendation item related to content reproduced by the second device 200, which may be a display device installed in the bus.

In operation S630, the second device 200 may generate the recommendation item related to the content reproduced by the second device 200. In the present exemplary embodiment, the second device 200 may generate the recommendation item in real-time at a point of time when the second device 200 receives a request for the recommendation item from the first device. For example, the second device 200 may capture a screen that reproduces the content at the point of time when the second device 200 receives the request. Then, the second device 200 may generate a resume item by linking the captured image to reproduction position information indicating a reproduction position of the content that is reproduced while captured.

Before the second device 200 receives the request for the recommendation item from the first device 100, the second device 200 may previously generate the recommendation item related to the reproduced content. In this case, when the second device 200 receives the request for the recommendation item from the first device 100, the second device 200 may extract the recommendation item related to the reproduced content from its memory.

In operation S640, the second device 200 may provide to the first device 100 the recommendation item related to the reproduced content. For example, the second device 200 may transmit at least one of the resume item, an application item, an additional information item, and an advertisement item to the first device 100 via short-distance communication.

After the second device 200 transmits the recommendation item, if the recommendation item is subsequently updated, the second device 200 may transmit the updated recommendation item to the first device 100. In a case of the resume item, because the reproduction position of the content is changed according to an elapse of time, the second device 200 may update the resume item according to a changed reproduction position of the content and may transmit the updated resume item to the first device 100. When the second device 200 receives the request for the recommendation item from the first device 100, the second device 200 may periodically transmit the recommendation item.

The first device 100 may receive from the second device 200 the recommendation item related to the content reproduced by the second device 200.

In operation S650, the first device 100 may store in its memory the recommendation item received from the second device 200. Here, because the first device 100 is positioned in the service zone 600 of the second device 200, the first device 100 may only store in the memory the recommendation item received from the second device 200, and may not display the recommendation item on a screen.

In operation S660, the first device 100 may sense an exit of the first device 100 from the service zone 600 of the second device 200. In this case, in operation S670, the first device 100 may display the recommendation item on the screen.

That is, while the first device 100 is positioned in the service zone 600 of the second device 200, the first device 100 may not display on the screen the recommendation item received from the second device 200, and then, when the first device 100 exits the service zone 600 of the second device 200, the first device 100 may display on the screen the recommendation item related to the content reproduced by the second device 200. In another exemplary embodiment, an order of operations S610 through S670 may be changed or some operations may be skipped. For example, in a case where the second device 200 periodically broadcasts the recommendation item, an operation of requesting by the first device 100 the second device 200 for the recommendation item may not be required.

Figure 7:
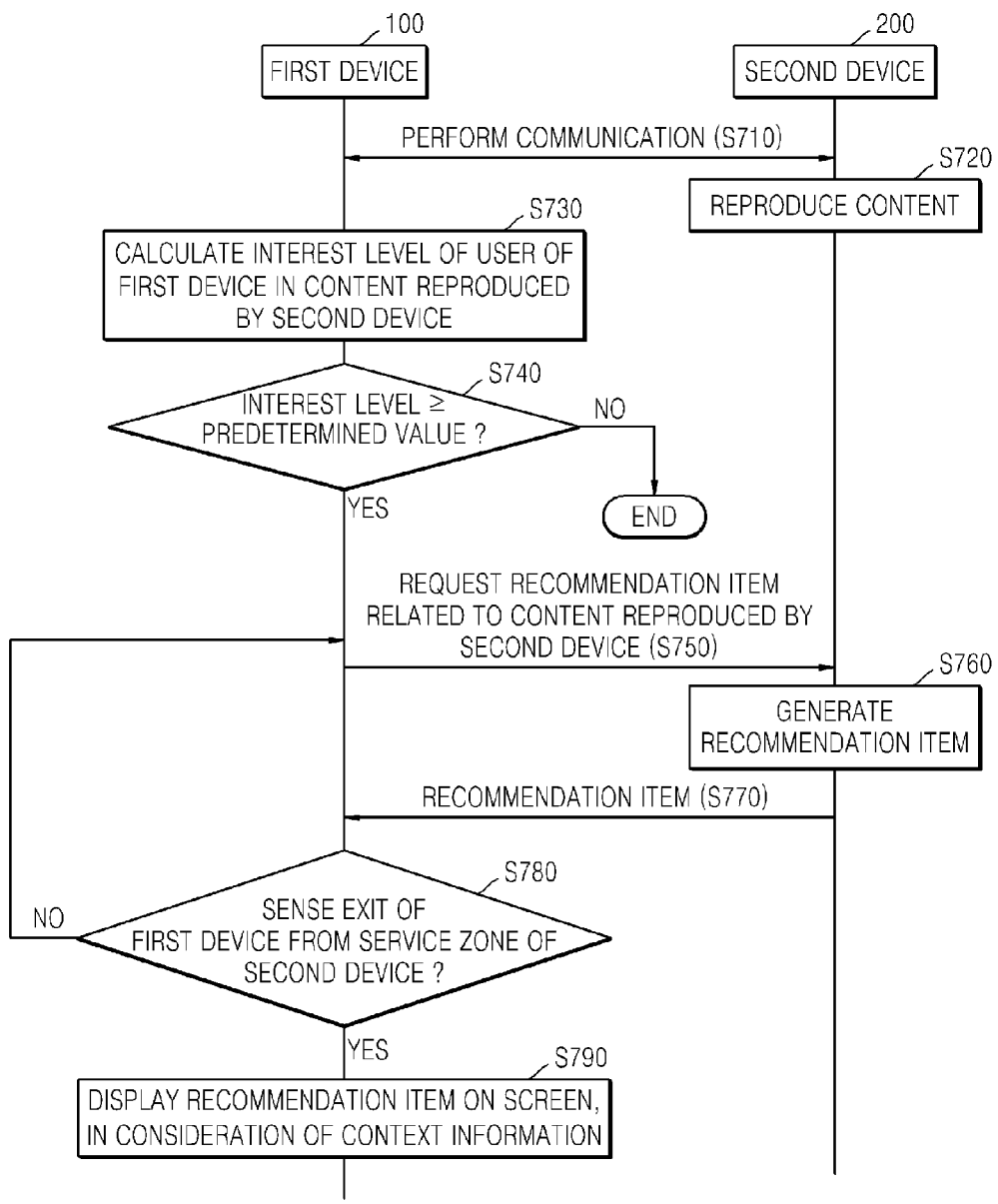
FIG. 7 is a flowchart of a method of displaying a recommendation item, the method performed by the first device, according to another exemplary embodiment.

With reference to FIG. 7, a method of providing a recommendation item without using the management server 300, the method performed by the first device 100 and the second device 200, will now be described.

FIG. 7 is a flowchart of a method of displaying a recommendation item, the method performed by the first device 100, according to another exemplary embodiment.

In operation S710, the first device 100 and the second device 200 may be able to communicate with each other. For example, the first device 100 and the second device 200 may be connected to each other via a short-distance communication network such as Wi-Fi, Bluetooth, NFC, ZigBee, WFD, UWB, etc.

In operation S720, the second device 200 may reproduce content. In the present exemplary embodiment, the content may include, but is not limited to, education content, movie content, broadcasting content, game content, advertisement content, still image content, and news content.

In another exemplary embodiment, an order of operations S710 and S720 may be changed. That is, the second device 200 may reproduce the content while the second device 200 is connected with the first device 100 via a communication network, or the second device 200 may be connected with the first device 100 via the communication network after the second device 200 reproduces the content.

In operation S730, the first device 100 may calculate an interest level of a user of the first device 100 in the content reproduced by the second device 200, based on a plurality of pieces of event information. For example, the first device 100 may calculate a probability that the user of the first device 100 might view the content reproduced by the second device 200, based on input information of the user, state information of the user, the current position information, reservation history information, etc, and therefore may calculate the interest level of the user of the first device 100 on the content reproduced by the second device 200. Because operation S730 corresponds to operation S420 shown in FIG. 4, the detailed descriptions thereof are omitted here.

In operation S740, the first device 100 may determine whether the interest level of the user of the first device 100 in the content reproduced by the second device 200 is equal to or greater than a predetermined value (e.g., whether a probability that the user of the first device 100 might view the content reproduced by the second device 200 is equal to or greater than 85%). The predetermined value may be set in the first device 100 or may be set by the user.

Because operation S740 corresponds to operation S425 shown in FIG. 4, the detailed descriptions thereof are omitted here.

In operation S750, when the interest level of the user of the first device 100 in the content reproduced by the second device 200 is equal to or greater than the predetermined value, the first device 100 may request the second device 200 for a recommendation item. For example, when the probability that the user of the first device 100 might view the content reproduced by the second device 200 is equal to or greater than 85%, the first device 100 may request the second device 200 for the recommendation item related to the reproduced content.

On the other hand, when the probability that the user of the first device 100 might view the content reproduced by the second device 200 is less than the predetermined value, the first device 100 may not request the second device 200 for the recommendation item.

In the present exemplary embodiment, the first device 100 in a predetermined context may estimate (or may determine), without calculating the interest level, that the interest level of the user of the first device 100 on the content reproduced by the second device 200 is equal to or greater than the predetermined value. In this case, the first device 100 may request the second device 200 for the recommendation item.

For example, when the first device 100 has a purchase history of purchasing a ticket to view content reproduced by the second device 200, or has a check-in history with respect to checking-in to a service zone of the second device 200, the first device 100 may determine that the interest level of the user of the first device 100 in the content reproduced by the second device 200 is equal to or greater than the predetermined value, and may request the second device 200 for the recommendation item.

In operation S760, the second device 200 may generate the recommendation item related to the content reproduced by the second device 200. For example, the second device 200 may generate a resume item by using a captured image (i.e., a last screen image) obtained by capturing a screen and reproduction position information (e.g., link information or index information) of the content. Also, the second device 200 may generate an additional information item by using additional information of the reproduced content or may generate an application item by using application information corresponding to the reproduced content. Here, the second device 200 may generate the recommendation item in the form of an object for using a service or in the form of a list. However, the method for generating the recommendation item is not limited thereto.

In operation S770, the first device 100 may receive the recommendation item. In the present exemplary embodiment, the first device 100 may periodically receive the recommendation item from the second device 200.

In operation S780, the first device 100 may sense an exit of the first device 100 from the service zone of the second device 200. If the first device 100 does not exit from the service zone of the second device 200, the first device 100 may not display the recommendation item on a screen, and may request again and receive a recommendation item from the second device 200 (repetition of operations S750 through S770).

In operation S790, when the first device 100 senses the exit of the first device 100 from the service zone of the second device 200, the first device 100 may display on the screen the recommendation item related to the content reproduced by the second device 200. In a case where the first device 100 periodically receives a recommendation item from the second device 200, the first device 100 may display on the screen a recommendation item that is lastly received by the first device before the first device 100 senses the exit of the first device 100 from the service zone of the second device 200. In the present exemplary embodiment, the screen may include a first screen.

According to the present exemplary embodiment, the first device 100 may perform a context analysis and then, only when there is a high probability that the user of the first device 100 views the content reproduced by the second device 200, the first device 100 may request the second device 200 for the recommendation item related to the content reproduced by the second device 200.

The first device 100 may display the recommendation item on the screen, in consideration of context information.

For example, when the first device 100 senses a gesture of the user of the first device 100 that requests the recommendation item, the first device 100 may display the recommendation item on the screen. The gesture for requesting the recommendation item may vary.

Additionally, the first device 100 may display the recommendation item on the screen, based on luminance information, tilt information, etc. For example, when a luminance of the first device 100 is less than a predetermined value, the first device 100 may not display the recommendation item on the screen, and when the luminance of the first device 100 is equal to or greater than the predetermined value, the first device 100 may display the recommendation item on the screen.

That is, in a case where the user of the first device 100 keeps the first device 100 in a pocket of the user, or does not carry the first device 100 in the hand of the user, it may mean that the user may not have an intention to receive the recommendation item. Thus, the first device 100 may not display the recommendation item on the screen, based on the luminance information or the tilt information.

On the other hand, when the first device 100 exits the service zone of the second device 200, if the user of the first device 100 stares at the screen of the first device while the user holds the first device 100 in the user's hand, the first device 100 may display on the screen the recommendation item related to the content reproduced by the second device 200.

The first device 100 may display the recommendation item according to a user-designated setting. For example, the first device 100 may provide the recommendation item in the form of a pop-up window or may display the recommendation item on a specific page.

The first device 100 may scan the service zone of the second device 200 that the first device 100 previously visited, and the scan may be performed within a predetermined range with respect to a current position of the first device. When the service zone of the second device 200 that the first device 100 previously visited is scanned, the first device 100 may extract a recommendation item related to content that was previously reproduced by the second device 200 and may display the recommendation item on the screen.

Figure 8:
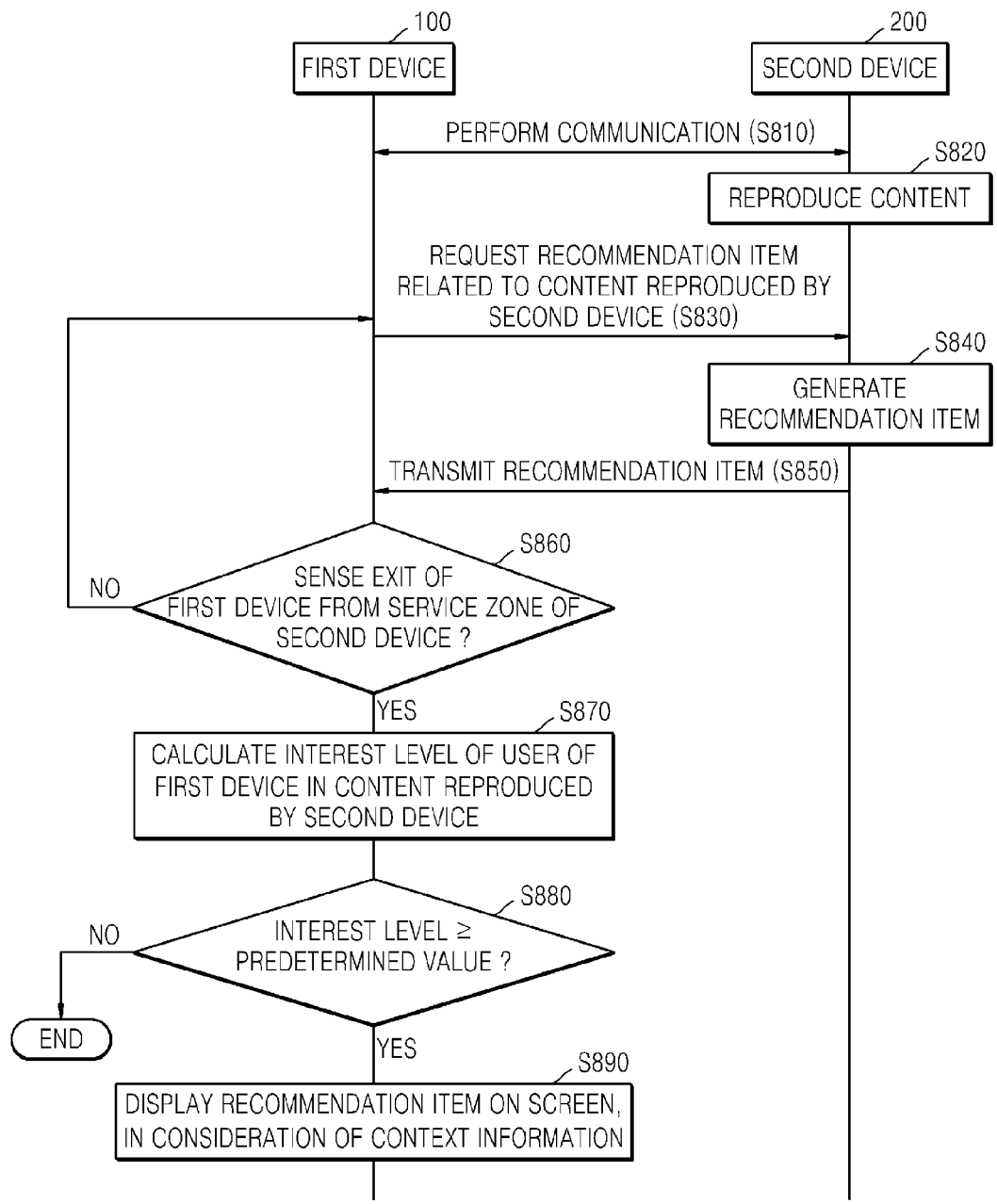
FIG. 8 is a flowchart of a method of providing a recommendation item, the method performed by a second device, according to an exemplary embodiment.

FIG. 8 is a flowchart of a method of providing a recommendation item, the method performed by the second device 200, according to an exemplary embodiment. In this regard, repeated detailed descriptions of same operations of the method of FIG. 7 are omitted here.

In operation S810, the first device 100 and the second device 200 may be able to communicate with each other. In operation S820, the second device 200 may reproduce content. In operation S830, the second device 200 may receive from the first device 100 a request for a recommendation item related to the content reproduced by the second device 200.

In operation S840, the second device 200 may generate the recommendation item. For example, the second device 200 may generate an application item, a resume item, an additional information item, or an advertisement item as the recommendation item corresponding to the reproduced content, but one or more exemplary embodiments are not limited thereto.

In operation S850, the second device 200 may transmit the recommendation item to the first device 100.

In operation S860, the first device 100 may sense an exit of the first device 100 from a service zone of the second device 200. If the first device 100 does not exit from the service zone of the second device 200, the first device 100 may again request and receive a recommendation item from the second device 200 (repetition of operations S830 through S850). For example, when the first device 100 does not exit from the service zone of the second device 200, the first device 100 may periodically receive a recommendation item that is updated in the second device 200.

In operation S870, when the first device 100 senses the exit of the first device 100 from the service zone of the second device 200, the first device 100 may calculate an interest level of the user of the first device 100 on the content reproduced by the second device 200, based on a plurality of pieces of event information that are received by the first device 100.

In operation S880, the first device 100 may determine whether the interest level of the user of the first device 100 in the content reproduced by the second device 200 is equal to or greater than a predetermined value.

For example, the first device 100 may determine whether a probability that the user of the first device 100 might view the content reproduced by the second device 200 is equal to or greater than 90%. When the probability that the user of the first device 100 might view the content reproduced by the second device 200 is less than the predetermined value (e.g., less than 90%), the first device 100 may not display on a screen the recommendation item received from the second device 200.

In operation S890, when the calculated interest level of the user is equal to or greater than the predetermined value (e.g., 90%), the first device 100 may display on the screen the recommendation item received from the second device 200.

According to the present exemplary embodiment, in a case where a recommendation item is periodically received, the first device 100 may display on the screen a recommendation item that is lastly received by the first device before the first device 100 senses the exit of the first device 100 from the service zone of the second device 200.

The first device 100 may display the recommendation item on the screen, in consideration of context information. Operation S890 corresponds to operation S790 of the method of FIG. 7, thus, detailed descriptions thereof are omitted here.

Hereinafter, a case in which, when the first device 100 exits a service zone of the second device 200, the first device 100 directly generates and displays a recommendation item related to content reproduced by the second device 200 will be described in detail with reference to FIGS. 9 and 10.

Figure 9:
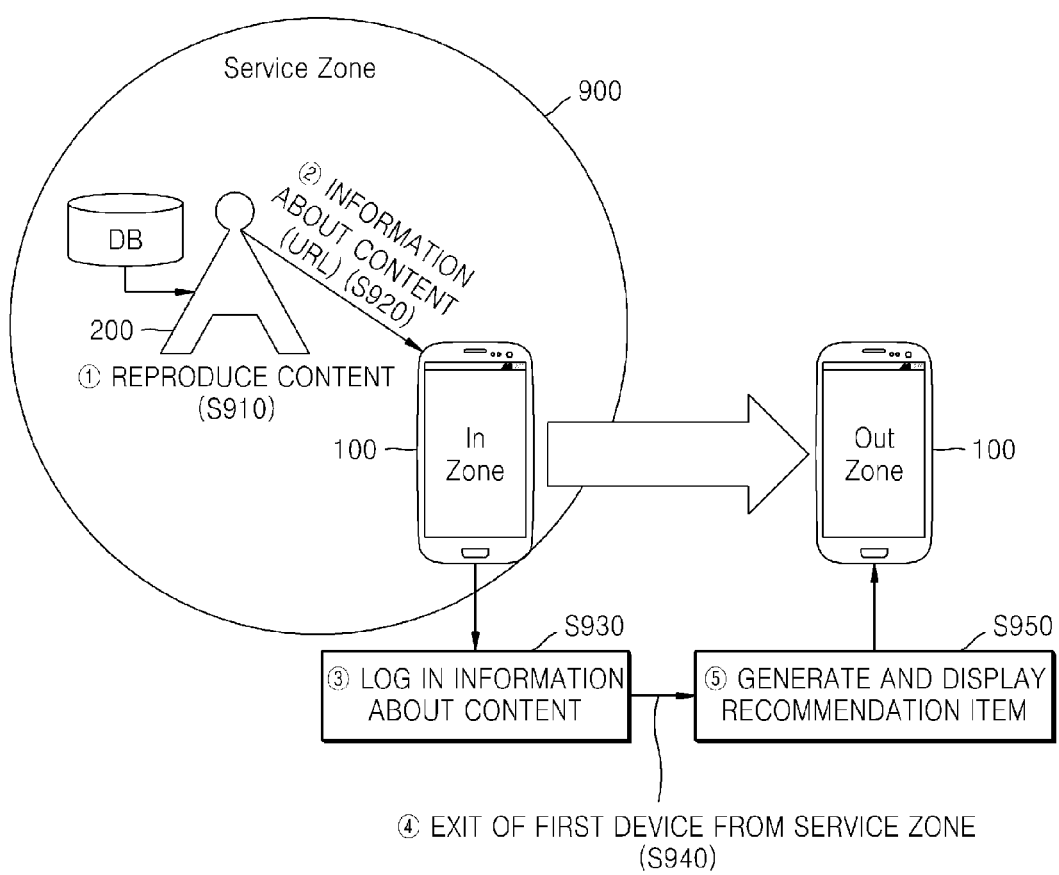
FIG. 9 illustrates a method of displaying a recommendation item, the method performed by the first device, according to another exemplary embodiment.

FIG. 9 illustrates a method of displaying a recommendation item, the method performed by the first device 100, according to another exemplary embodiment.

In operation S910, the second device 200 may reproduce content. Then, in operation S920, the second device 200 may broadcast information about the content reproduced by the second device 200. For example, the second device 200 may periodically broadcast at least one of a captured image obtained by capturing a screen that reproduces the content, reproduction position information (e.g., a URI, URL, etc.) indicating a reproduction position or location of the content that is reproduced when captured, application information corresponding to the content, additional information about the content, and advertisement information corresponding to the content.

In operation S930, the first device 100 positioned in a service zone 900 of the second device 200 may obtain the information about the content reproduced by the second device 200. That is, according to the present exemplary embodiment, the first device 100 may log in the information about the content reproduced by the second device 200 while the first device 100 is positioned in the service zone 900 of the second device 200.

In operation S940, the first device 100 may sense an exit of the first device 100 from the service zone 900 of the second device 200.

For example, when communication with the second device 200 is discontinued, the first device 100 may sense the exit of the first device from the service zone 900 of the second device 200.

Additionally, when the first device 100 recognizes or senses an external device (e.g., an NFC tag, a BLE tag, etc.) located outside of the service zone 900 of the second device 200, or at a boundary of the service zone 900 of the second device 200, the first device 100 may determine that the first device has exited the service zone 900 of the second device 200.

When the first device 100 previously stores information about the service zone 900 of the second device 200, or receives the information about the service zone 900 of the second device 200 from the second device 200, the first device 100 may sense the exit of the first device from the service zone 900 of the second device 200 by using position information of the first device 100.

In operation S950, the first device 100 may generate a recommendation item, based on the information about the content which is received from the second device 200. For example, the first device 100 may generate a resume image related to the content reproduced by the second device 200, by using the captured image and the reproduction position information that are lastly received before the exit of the first device is sensed. Then, the first device 100 may generate an application item, an additional information item, and an advertisement item that are related to the content reproduced by the second device 200.

The first device 100 may display the recommendation item on a screen of the first device 100. In the present exemplary embodiment, the screen may include a first screen.

The first device 100 may generate the recommendation item and then may immediately display the recommendation item on the screen, or may display the recommendation item on the screen only when the first device 100 senses a gesture of the user that requests the recommendation item.

That is, according to the present exemplary embodiment, the first device 100 may log in the information about the content reproduced by the second device 200 while the first device 100 is positioned in the service zone 900 of the second device 200, and when the first device 100 exits the service zone 900 of the second device 200, the first device 100 may display on the screen (e.g., the first screen) the recommendation item related to the content reproduced by the second device 200. This process will be described in detail with reference to FIG. 10.

FIG. 10 is a flowchart of a method of displaying a recommendation item, the method performed by the first device 100, according to another exemplary embodiment. In this regard, repeated detailed descriptions of same operations of the method of FIG. 9 are omitted here.

In operation S1010, the second device 200 may reproduce content.

In operation S1020, the second device 200 may broadcast information (e.g., an image, reproduction position information, additional information, advertisement information, application information, etc.) about the reproduced content.

In operation S1030, the first device 100 positioned in a service zone of the second device 200 may obtain the information about the content reproduced by the second device 200. The first device 100 may manage the received information about the content.

In operation S1040, the first device 100 may sense an exit of the first device 100 from the service zone of the second device 200. The sensing method performed by the first device 100 is already described above and thus detailed descriptions thereof are omitted here.

If the first device 100 does not exit from the service zone of the second device 200, the first device 100 may keep collecting a plurality of pieces of the information about the content which are broadcast from the second device 200.

In operation S1050, when the first device 100 senses the exit of the first device 100 from the service zone of the second device 200, the first device 100 may calculate an interest level of a user of the first device 100 in the content reproduced by the second device 200, based on a plurality of pieces of event information that are received by the first device 100.

In operation S1060, the first device 100 may determine whether the interest level of the user of the first device 100 in the content reproduced by the second device 200 is equal to or greater than a predetermined value (e.g., 70%). As a result of the determination, when the interest level of the user of the first device 100 in the content reproduced by the second device 200 is less than the predetermined value (e.g., 70%), the first device 100 may not generate the recommendation item.

In operation S1070, when the calculated interest level is equal to or greater than the predetermined value (e.g., 70%), the first device 100 may generate the recommendation item, based on the information about the content which is received from the second device 200.

In operation S1080, the first device 100 may display the recommendation item on a screen (e.g., a first screen).

In the present exemplary embodiment, while the first device 100 is in the service zone of the second device 200, the first device 100 may continue to receive the information about the content reproduced by the second device 200, and when the first device 100 exits the service zone of the second device 200, the first device 100 may generate the recommendation item related to the content reproduced by the second device 200, and may display the recommendation item on the screen.

Also, according to the present exemplary embodiment, the first device 100 may perform a context analysis and therefore, when there is a high probability that the user of the first device 100 might view the content reproduced by the second device 200, the first device 100 may generate the recommendation item related to the content reproduced by the second device 200 and may display the recommendation item on the screen so as to allow the user to continuously use the content reproduced by the second device 200 although the user exits the service zone of the second device 200.

Figure 11A:
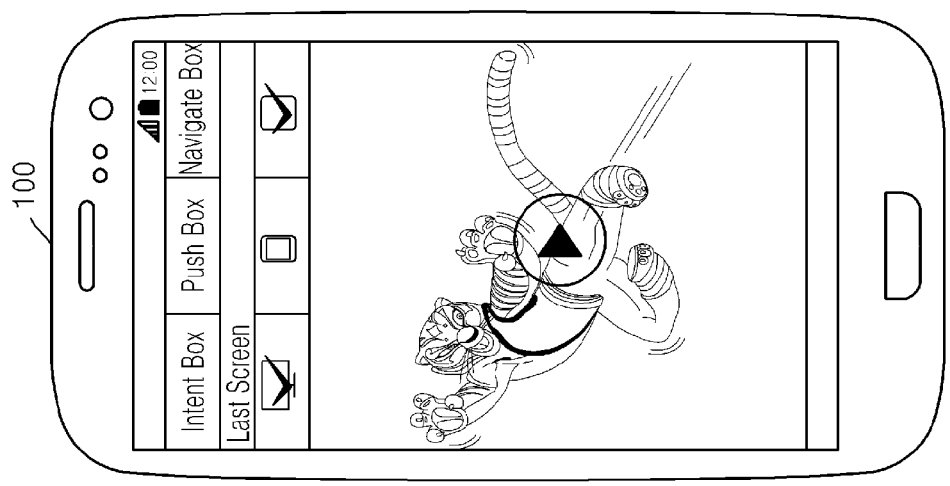
FIGS. 11A and 11B illustrate screens for displaying one or more recommendation items, according to an exemplary embodiment.
Figure 11B:
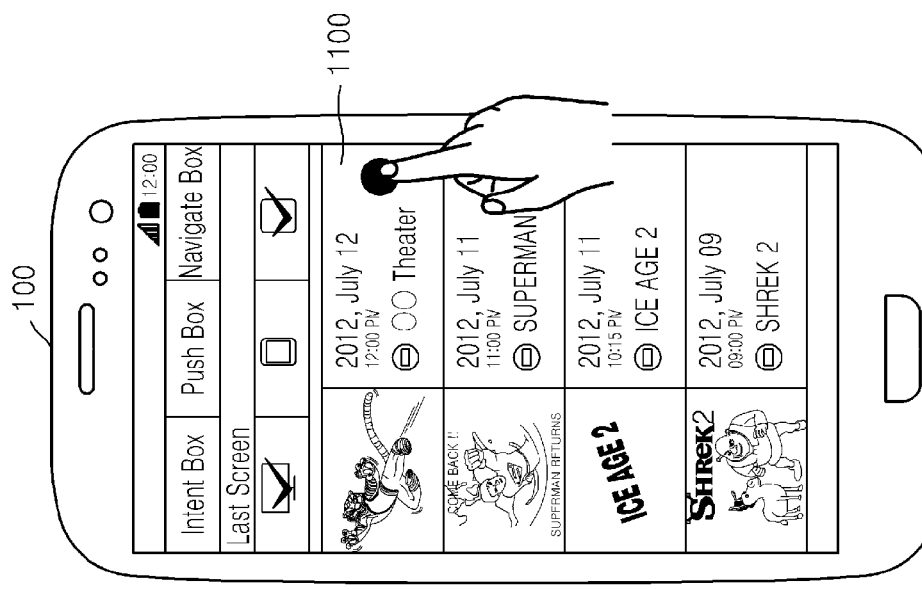

FIGS. 11A and 11B illustrate screens for displaying one or more recommendation items, according to an exemplary embodiment.

As illustrated in FIG. 11A, the first device 100 may display on a screen recommendation items in the form of a list, wherein the recommendation items are related to a plurality of pieces of content that are reproduced by a plurality of second devices 200. That is, the recommendation items may be related to the plurality of pieces of content reproduced by a plurality of second devices 200, each of which is different from each other. For example, in a case where a user goes to a theater by bus, watches a movie, and then comes back home by subway, the first device 100 may display a list of a first recommendation item related to animation content reproduced in the bus, a second recommendation item related to movie content shown in the theater, and a third recommendation item related to advertisement content reproduced in a subway station or in a subway train.

The first device 100 may array the list of recommendation items in a time-sequential order according to generation times of the recommendation items, or may array the list of recommendation items in an order according to time periods in which the first device 100 stayed in the service zones.

The first device 100 may sense a user selection with respect to a recommendation item 1100 related to movie content titled "Kung Fu Panda" from the list of recommendation items. The recommendation item 1100 related to movie content titled "Kung Fu Panda" may be a resume item in which link information or index information is connected with a captured image that is obtained at a point of time when the first device 100 exits a service zone of the second device 200.

For example, when the user of the first device 100 watches the movie content "Kung Fu Panda" in an airplane and then gets off the airplane at the user's destination, the first device 100 may sense that the user has left the airplane and then may display on a screen a resume item for allowing the user to resume reproduction of the movie content "Kung Fu Panda" that the user watched before getting off the airplane. In one or more exemplary embodiments, the resume item may be generated by the management server 300, the second device 200, or the first device 100.

As illustrated in FIG. 11B, when the user of the first device 100 selects the recommendation item 1100 related to the movie content titled "Kung Fu Panda", the first device 100 may check the link information or the index information included in the recommendation item 1100. Afterward, based on the checked link information or the checked index information, the first device 100 may resume reproduction of the content after the point of time when the first device 100 exits the service zone of the second device 200. For example, the first device 100 may resume reproduction of the movie content "Kung Fu Panda" that the user did not complete watching due to getting off the airplane.

FIGS. 12A, 12B and 12C illustrate a method of receiving a recommendation item from an external device and displaying the recommendation item, the method performed by the first device 100, according to an exemplary embodiment.

As illustrated in FIG. 12A, the first device 100 may sense a user gesture for requesting recommendation items that are displayed on one or more external devices 400-1, 400-2, and 400-3. Here, in response to the user gesture, the first device 100 may transmit signals to the one or more external devices 400-1, 400-2, and 400-3 so as to request the recommendation items.

As illustrated in FIG. 12B, the first device 100 may receive from the one or more external devices 400-1, 400-2, and 400-3 the recommendation items that are displayed on the one or more external devices 400-1, 400-2, and 400-3. Then, the first device 100 may add the recommendation items received from the one or more external devices 400-1, 400-2, and 400-3 to a predetermined screen (or a predetermined page) and may display the recommendation items.

The user may check the recommendation items (e.g., a recommendation item 1, a recommendation item 2, and a recommendation item 3) received from the one or more external devices 400-1, 400-2, and 400-3, and may delete some of the recommendation items (e.g., the recommendation item 2). That is, in a case where the first device 100 senses a deletion request gesture with respect to the recommendation item 2, the first device 100 may delete the recommendation item 2 from a list of the recommendation items. The deletion request gesture may vary. For example, an example of the deletion request gesture may include, but is not limited to, a swipe gesture, a flick gesture, a tap gesture, and a drag and drop gesture.

As illustrated in FIG. 12C, the first device 100 may delete from the list of the recommendation items the recommendation item 2 to which the deletion request gesture is sensed, and may re-array the list of the recommendation items.

Figure 13A:
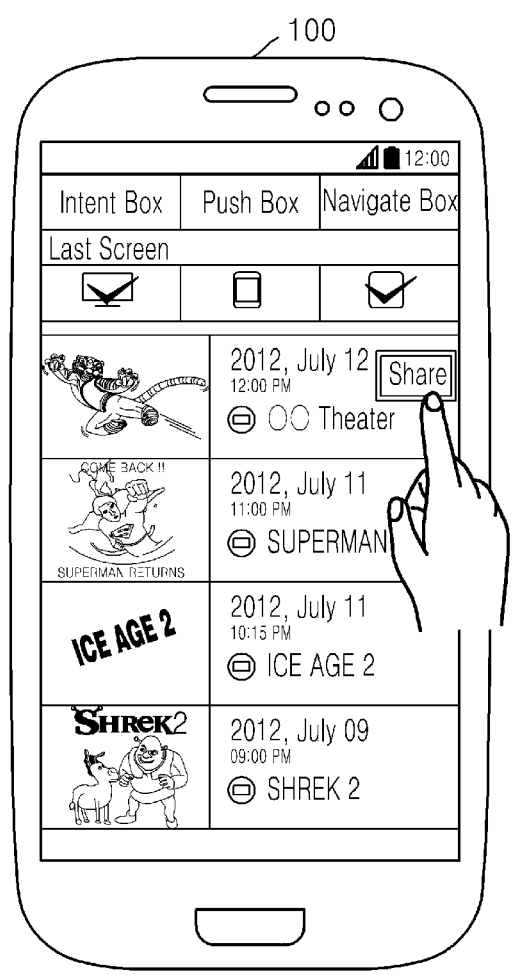
FIGS. 13A through 13C illustrate a method of sharing a recommendation item with an external device, the method performed by the first device, according to an exemplary embodiment.
Figure 13B:
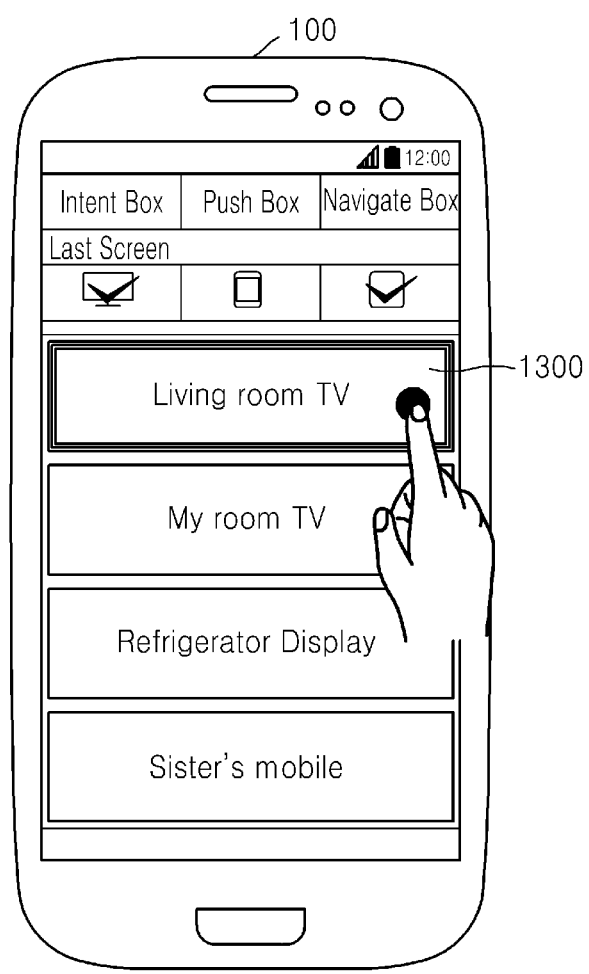
Figure 13C:
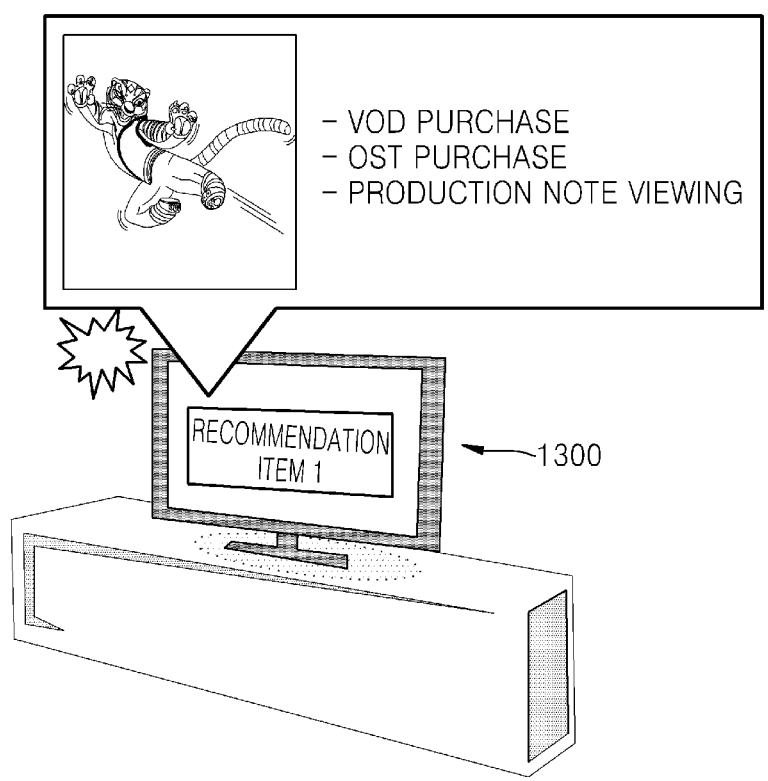

FIGS. 13A through 13C illustrate a method of sharing a recommendation item with an external device, the method performed by the first device 100, according to an exemplary embodiment.

As illustrated in FIG. 13A, the first device 100 may receive, from a user, a share request for a recommendation item shared with the external device.

As illustrated in FIG. 13B, in response to the share request from the user, the first device 100 may display a list of one or more external devices (e.g., a living room TV, a room TV 1300, a display of a refrigerator, a brother's mobile phone, etc.) capable of sharing the recommendation item. The one or more external devices may be scanned around the first device 100 via short-distance communication (e.g., Bluetooth communication, Wi-Fi communication, etc.). Also, according to the present exemplary embodiment, the one or more external devices may be universal plug and play (UPnP)-based scanned.

The first device 100 may sense user selection of the living room TV 1300 from the list of one or more external devices (e.g., the living room TV 1300, the room TV, the display of refrigerator, the sister's mobile phone, etc.).

As illustrated in FIG. 13C, the first device 100 may transmit to the living room TV 1300 the recommendation item that the user wants to share. Here, the first device 100 may perform a procedure of authenticating the living room TV 1300. For example, the first device 100 may authenticate whether the living room TV 1300 is capable of displaying the recommendation item, based on authentication information, ID information of the living room TV 1300, etc. that are received from the living room TV 1300.

The living room TV 1300 that has received the recommendation item from the first device 100 may display the received recommendation item on its screen. Then, the living room TV 1300 may receive a user selection with respect to the recommendation item. If the recommendation item received from the first device 100 is a resume item, the living room TV 1300 may resume reproduction of content.

If the recommendation item received from the first device 100 is an additional information item related to movie content, the living room TV 1300 may display on the screen a plurality of pieces of additional information such as a video on demand (VOD) purchase, an original soundtrack (OST) purchase, a production note viewing, etc. that are related to the movie content.

Figure 14A:
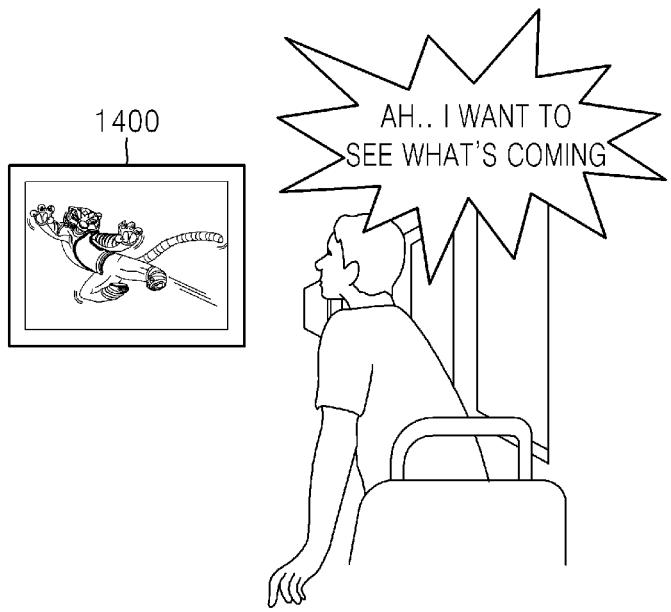
FIGS. 14A and 14B illustrate a method of providing a recommendation item related to content reproduced by public transportation, the method performed by the first device, according to an exemplary embodiment.
Figure 14B:
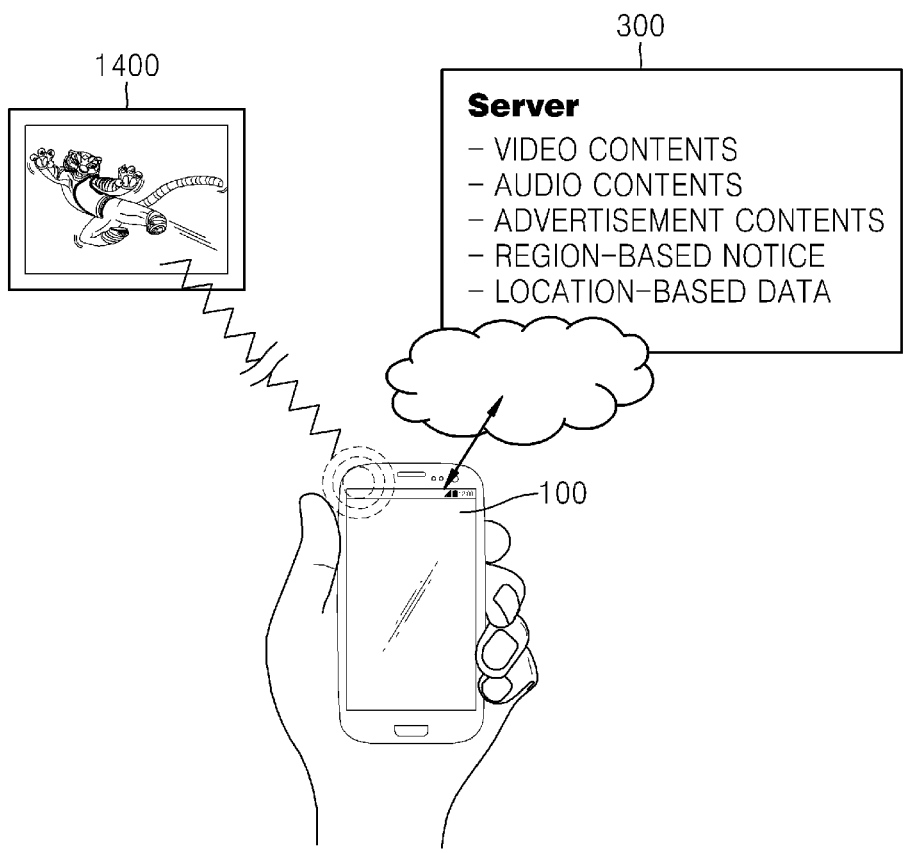

FIGS. 14A and 14B illustrate a method of providing a recommendation item related to content reproduced by public transportation, the method performed by the first device 100, according to an exemplary embodiment.

As illustrated in FIG. 14A, in a case where a user views content by using a display device 1400 available in an airplane and then gets off the airplane at the destination, the user may no longer view the content.

Here, as illustrated in FIG. 14B, the first device 100 may sense that the first device 100 exits a service zone of the display device 1400 available in the airplane, and may display on a screen a recommendation item related to the content reproduced by the display device 1400.

Figure 15C:
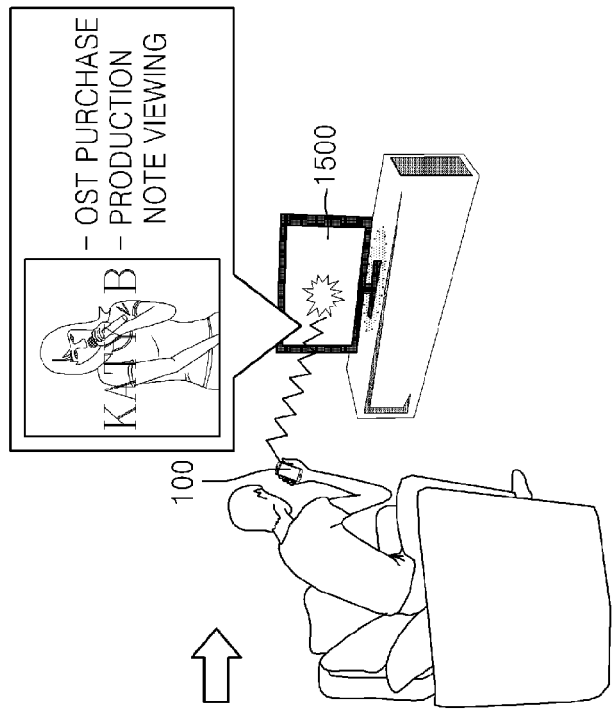
FIGS. 15A, 15B, and 15C illustrate a method of providing a recommendation item related to movie content shown in a theater, the method performed by the first device, according to an exemplary embodiment.
Figure 15B:
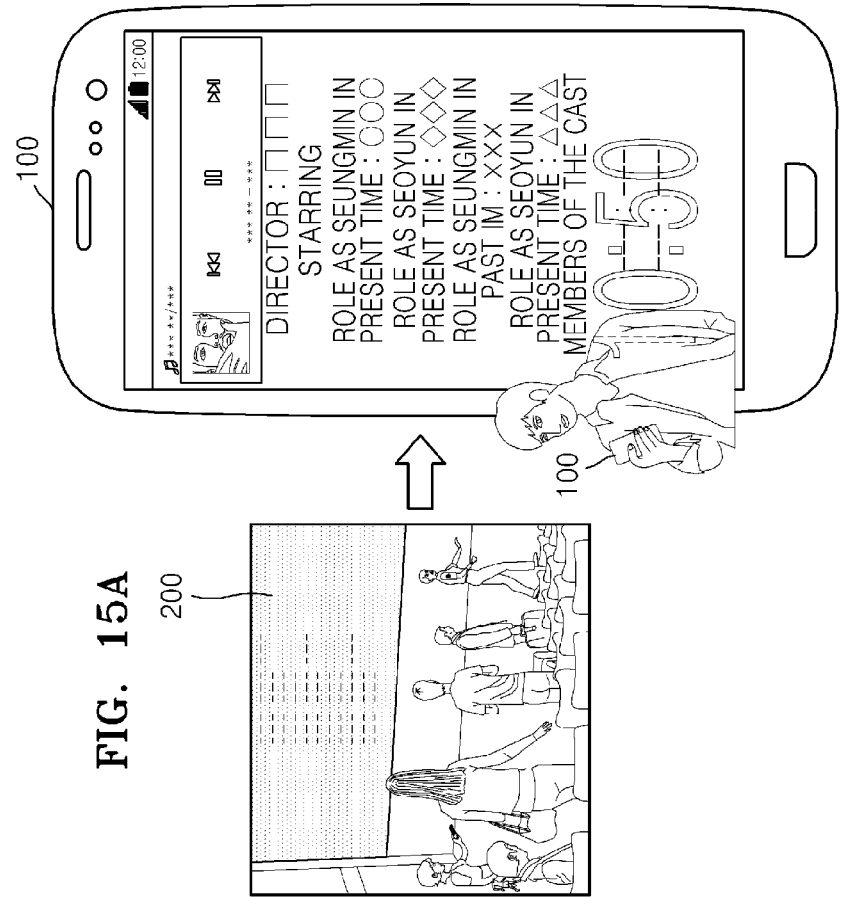
Figure 15A:
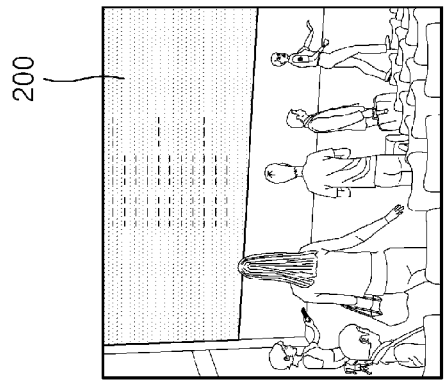

FIGS. 15A, 15B, and 15C illustrate a method of providing a recommendation item related to movie content shown in a theater, the method performed by the first device 100, according to an exemplary embodiment.

As illustrated in FIG. 15A, a user may watch a movie via the second device 200 in the theater, and then may leave the theater before reproduction of the movie is completed. In this case, the first device 100 may recognize an external device (e.g., an NFC tag, a BLE tag, etc.) positioned at an entrance of the theater and therefore may determine that the first device 100 has exited from a service zone of the second device 200.

As illustrated in FIG. 15B, the first device 100 may provide a resume item to a screen of the first device 100 so as to allow the user of the first device 100 to resume reproduction of the content from a point of time when the user of the first device 100 exits the service zone of the second device 200, wherein the content is reproduced by the second device 200. By doing so, the user may continue watching the rest of the content that the user could not watch in the theater.

As illustrated in FIG. 15C, the first device 100 may transmit recommendation items (e.g., an additional information item and an advertisement item) to an external device (e.g., a home TV 1500). In this case, the user may check additional information related to the content shown in the theater, via the home TV 1500.

FIGS. 16A, 16B, 16C, and 16D illustrate a method of providing a recommendation item related to sports content played in a sports complex, according to an exemplary embodiment.

As illustrated in FIG. 16A, a user may watch a baseball game in a baseball stadium. Then, the user may check details of the baseball game via an electric signboard 1610 in the baseball stadium As illustrated in FIGS. 16B and 16C, when the user leaves the stands for a moment in the middle of the baseball game, the first device 100 may recognize an external device (e.g., an NFC tag, a BLE tag, etc.) 1620 located outside of the stands or at a boundary of the stands, and therefore may sense that the user has left the stands. In this case, the first device 100 may display an additional information item related to the details of the baseball game that are displayed on the electric signboard 1610, an application item for relaying the baseball game, or the like as a recommendation item on a screen.

As illustrated in FIG. 16D, although the user leaves the stands, the user may continue checking the details of the baseball game via the first device 100.

Figure 17A:
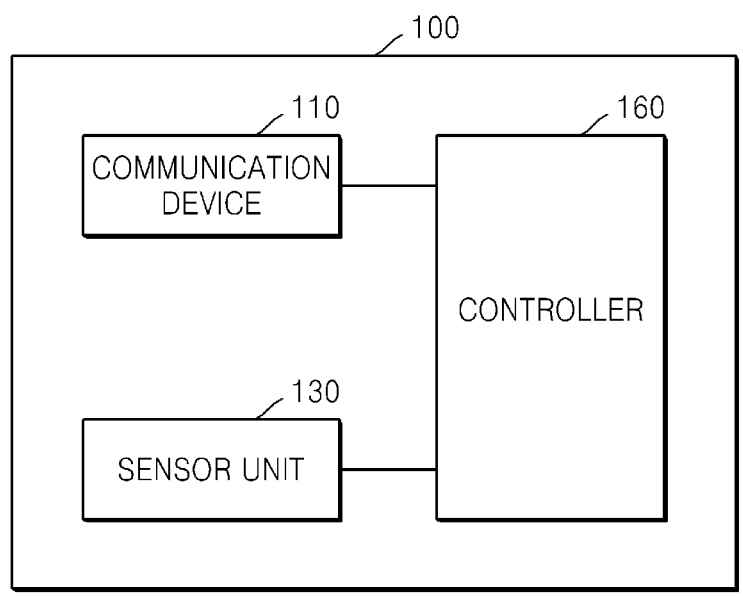
FIGS. 17A and 17B are block diagrams illustrating a configuration of the first device, according to an exemplary embodiment.
Figure 17B:
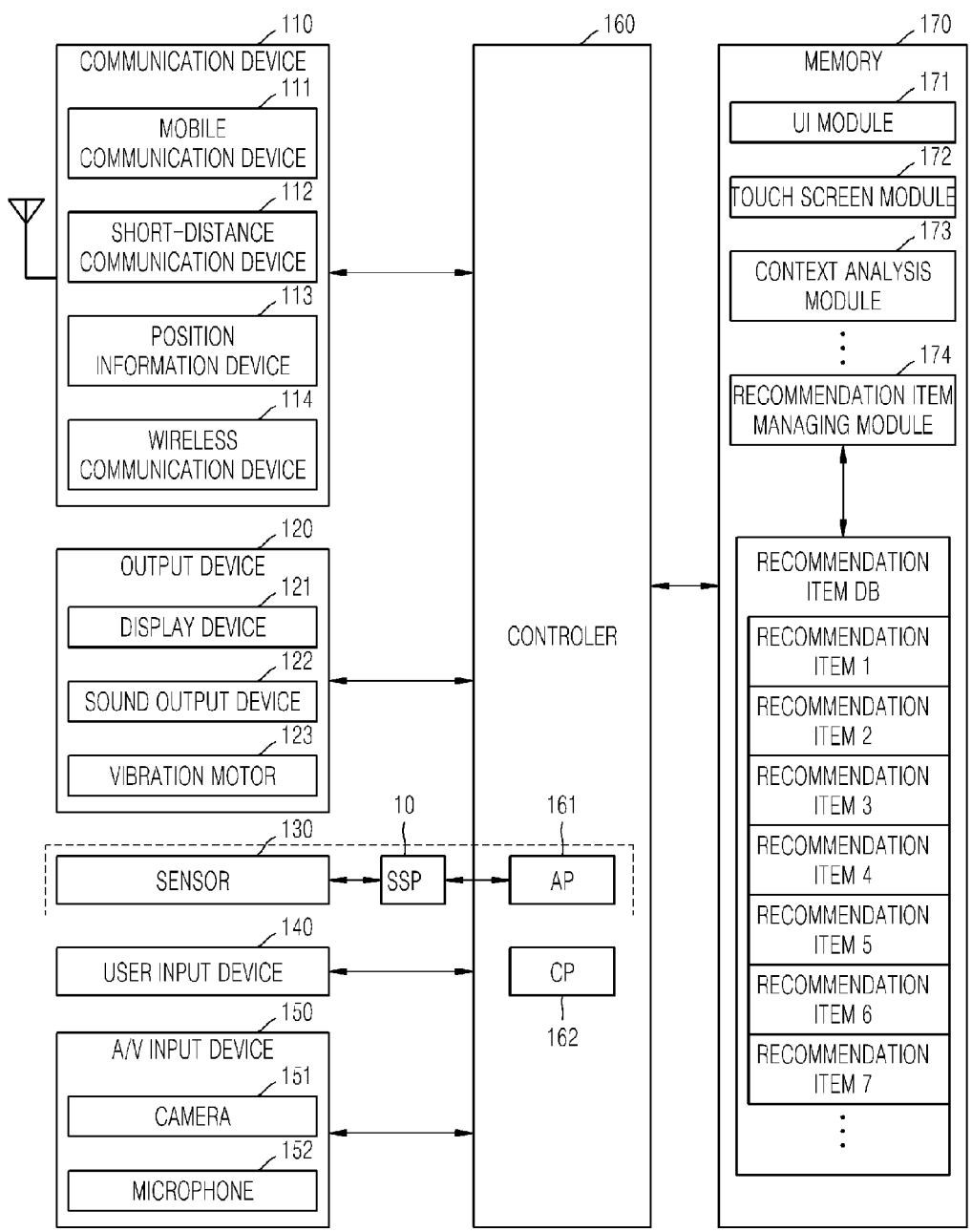

FIGS. 17A and 17B are block diagrams illustrating a configuration of the first device 100, according to an exemplary embodiment.

As illustrated in FIG. 17A, the first device 100 may include a communication device 110, a sensor 130, and a controller 160 (also referred as a processor 160). However, not all shown elements are necessary elements. That is, the first device 100 may be embodied with more or less elements than the shown elements.

For example, as illustrated in FIG. 17B, the first device 100 may include the communication device 110, an output device 120, the sensor 130, a user input device 140, an audio/video (A/V) input device 150, the controller 160, and a memory 170.

Hereinafter, the aforementioned elements are described.

The communication device 110 may include one or more elements for allowing communication between the first device 100 and the second device 200 or communication between the first device 100 and the management server 300. For example, the communication device 110 may include a mobile communication device 111, a short-distance communication device 112, a position information device 113, and a wireless communication device 114.

Also, the mobile communication device 111 exchanges a wireless signal with at least one of a base station, an external terminal, and a server through a mobile communication network. Here, the wireless signal may include a voice call signal, a video call signal, or various types of data according to an exchange of text/multimedia messages.

The short-distance communication device 112 is arranged for short-distance communication. In the present exemplary embodiment, examples of the short-distance communication may include, but are not limited to, Wi-Fi, Bluetooth, ZigBee, WFD, UWB, infrared Data Association (IrDA), and BLE.

The position information device 113 is arranged to check or obtain a position of the first device 100. An example of the position information device 113 may include a GPS module. The GPS module receives a plurality of pieces of position information from a plurality of satellites. Here, each of the plurality of pieces of position information may include information about coordinates consisting of latitude and longitude. In particular, the GPS module may obtain from the position information not only a position of latitude, longitude, and height but also may obtain three-dimensional (3D) speed information and exact time.

The wireless communication device 114 is for accessing the Internet or other networks wirelessly, and may be embedded in the first device 100 or may be arranged outside the first device 100.

The output device 120 may function to output an audio signal, a video signal, or a vibration signal, and may include a display 121, a sound output device 122, a vibration motor 123, or the like.

The display 121 displays and outputs information that is processed in the first device 100. For example, the display 121 may display on a screen (e.g., a first screen) a recommendation item related to content reproduced by the second device 200. Also, the display 121 may display on the screen another recommendation item that is received from an external device.

When the display 121 and a touch pad form a mutual layer structure and then are formed as a touch screen, the display 121 may be used as both an output device and input device. The display 121 may include at least one of a liquid crystal display (LCD), a thin film transistor-liquid crystal display (TFT-LCD), an organic light-emitting diode display, a flexible display, a 3D display, and an electrophoretic display, but is not limited thereto. Also, according to a type of the first device 100, the first device 100 may include at least two displays 121. Here, the at least two displays 121 may face each other by using a hinge.

In the present exemplary embodiment, the display 121 may be arranged in an external device connected with the first device 100. The external device may include an input device, an output device, a control device, and the like.

The display 121 may be included in a user's glasses. In this case, the first device 100 may display the recommendation item through the user's glasses.

The sound output device 122 may output audio data that is received from the communication device 110 or is stored in the memory 170. The sound output device 122 may also output a sound signal (e.g., a call signal receiving sound, a message receiving sound, or the like) related to capabilities performed by the first device 100. The sound output device 122 may include a speaker, a buzzer, or the like.

The vibration motor 123 may output a vibration signal. For example, the vibration motor 123 may output the vibration signal that corresponds to an output of the audio data (e.g., the call signal receiving sound, the message receiving sound, or the like) or video data. Also, when a touch is input to the touch screen, the vibration motor 123 may output a vibration signal, and when the first device 100 exits a service zone of the second device 200, the vibration motor 123 may output a vibration signal.

The sensor 130 may collect a plurality of pieces of event information about events that occur in the first device 100. For example, the sensor 130 may sense a position of the first device 100, user's state information, application information about at least one application used in the first device 100, exchanged message information, exchanged email information, call history information, SNS use information, webpage use information, transaction information, a user's eyes-position, or the like.

The sensor 130 may also sense whether the first device 100 exits the service zone of the second device 200. For example, the sensor 130 may sense that communication with the second device 200 is disconnected. Also, the sensor 130 may recognize an external device located outside of the service zone, or at a boundary of the service zone of the second device 200.

The sensor 130 may sense how far (e.g., about an N km) the first device 100 is from the service zone of the second device 200, by using information of Wi-Fi, GPS, a communication network base station, etc. Also, when a user performs a check-in procedure in the service zone of the second device 200 by using the first device 100, the sensor 130 may estimate a movement distance to which the first device 100 moves from a position of the check-in, by using an acceleration sensor.

The sensor 130 may include various sensors so as to collect the plurality of pieces of event information. For example, the sensor 130 may include, but is not limited to, an acceleration sensor, a tilt sensor, a gyro sensor, a 3-axis magnetic sensor, a voice recognition sensor, a luminance sensor, a temperature sensor, an image sensor (e.g., a camera), and a touch sensor.

The sensor 130 may interoperate with a seamless sensing platform (SSP) 10. The SSP 10 may include a sensor hub and an SSP manager. Here, the sensor 130 may be connected to the sensor hub, and the SSP manager may be included in a framework of an application processor (AP) 161.

Thus, the sensor hub may collect a plurality of pieces of sensing information (i.e., the plurality of pieces of event information about the events occurring in the first device 100) via the sensor 130. Here, in a case where the AP 161 in a sleep mode has to be active (e.g., in a case where the sensor 130 senses the exit from the service zone of the second device 200), the sensor hub may transmit an interrupt signal to the SSP manager so as to inform the SSP manager of data to be transmitted.

The SSP manager may transmit a signal requesting the sensor hub for a type and length of the data to be transmitted by the sensor hub. In this case, the sensor hub may transmit to the SSP manager a signal including the type and length of the data to be transmitted. The SSP manager may transmit a start-to-read message to the sensor hub, and when the sensor hub receives the start-to-read message, the sensor hub may process sensing data to a predefined packet and then may transmit the packet to the SSP manager.

In the present exemplary embodiment, the sensor 130 may be arranged in an external device that is connected with the first device 100. The external device may be related to an application that is executed in the first device 100. In another exemplary embodiment, one or more external devices may be arranged. The first device 100 may control the external device by using the application.

The first device 100 may receive from the external device data that is sensed by the sensor 130 arranged in the external device. For example, in a case where the temperature sensor is embedded in a watch, and the acceleration sensor is embedded in a belt, the first device 100 may receive temperature information from the watch and may receive acceleration information from the belt. Here, the watch and the belt may be controlled via an application installed in the first device 100.

According to the present exemplary embodiment, the various sensors may be separately embedded in peripheral devices so that power consumption of the first device 100 may be decreased.

The user input device 140 may be a device by which the user inputs data so as to control the first device 100. The user input device 140 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but one or more exemplary embodiments are not limited thereto.

The A/V input device 150 may be arranged to receive an input of an audio signal or a video signal and may include a camera 151, a microphone 152, or the like. The camera 151 may obtain an image frame such as a still image or a moving picture via an image sensor in a video call mode or a photographing mode. The image captured via the image sensor may be processed by the controller 160 or a separate image processing device (not shown). The processed image frame may be displayed on the display 121, may be stored in the memory 170, or may be transmitted to an external source via the communication device 110. According to a configuration of the first device 100, at least two cameras 151 may be arranged.

The microphone 152 may receive an input of an external voice signal in a call mode, a recording mode, or a voice recognition mode, and may process the voice signal into electrical voice data. In the call mode, the processed voice data may be converted to be transmitted to a mobile communication base station via the mobile communication device 111 and then may be output.

The controller 160 may generally control all operations of the first device 100. That is, the controller 160 may execute programs stored in the memory 170 and therefore may control the communication device 110, the output device 120, the sensor 130, the user input device 140, the A/V input device 150, the memory 170, or the like.

The controller 160 may include the AP 161 and a communication processor 162. The AP 161 may control execution of various applications stored in the memory 170. The communication processor 162 may control various communication functions. In the present exemplary embodiment, the AP 161 and the communication processor 162 may be integrally embodied as one hardware device or separately embodied as independent hardware devices.

The memory 170 may store a program to process and to control the controller 160, or may store a plurality of pieces of data (e.g., a recommendation item, information about content, sensing information, etc.) that are input/output.

The memory 170 may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. Also, the first device 100 may drive a web storage that performs a storing function of the memory 170 via the Internet.

The programs stored in the memory 170 may be classified into a plurality of modules according to their functions, for example, into a UI module 171, a touch screen module 172, a context analysis module 173, a recommendation item managing module 174, or the like.

The UI module 171 may provide a UI or graphical user interface (GUI) which are specialized according to applications. The touch screen module 172 may detect a user's touch gesture on the touch screen and may transmit information related to the touch gesture to the controller 160. The touch screen module 172 may be configured as a separate controller (hardware)

Various sensors may be arranged in or near the touch screen so as to detect a touch or a proximate touch on the touch sensor. An example of the sensor to detect the touch on the touch screen may be a tactile sensor. The tactile sensor detects a contact of a specific object by at least as much as a person can detect. The tactile sensor may detect various types of information such as the roughness of a contact surface, the hardness of the contact object, the temperature of a contact point, or the like.

The touch gesture of the user may include a tap gesture, a touch & hold gesture, a double tap gesture, a drag gesture, a panning gesture, a flick gesture, a drag & drop gesture, or the like.

"Tapping" is a user's motion of touching a screen by using a finger or a touch tool such as an electronic pen and then instantly lifting the finger or touch tool from the screen without moving.

"Touching & holding" is a user's motion of touching a screen by using a finger or a touch tool such as an electronic pen and then maintaining the above touching motion over a critical time (e.g., 2 seconds), after touching the screen. For example, a time difference between a touch-in time and a touch-out time is greater than or equal to the critical time, for example, 2 seconds. When a touch input lasts more than the critical time, in order to inform the user whether the touch input is tapping or touching & holding, a feedback signal may be provided in a visual, acoustic, or tactile manner. The critical time may vary according to the exemplary embodiments.

"Double tapping" is a user's motion of touching the screen twice by using the finger or touch tool (such as a stylus pen).

"Dragging" is a user's motion of touching the screen by using the finger or touch tool and moving the finger or touch tool to another position on the screen while keeping the touching motion. The dragging motion may enable the moving or panning motion of an object.

"Panning" is a user's motion of performing a dragging motion without selecting an object. Since no object is selected in the panning motion, no object is moved in a page but the page itself is moved on the screen or a group of objects may be moved within a page.

"Flicking" is a user's motion of performing a dragging motion over a critical speed, for example, 100 pixel/s, by using the finger or touch tool. The dragging (panning) motion or the flicking motion may be distinguished based on whether the moving speed of the finger or touch tool is over the critical speed, for example, 100 pixel/s, or not.

"Dragging & Dropping" is a user's motion of dragging an object to a predetermined position on the screen by using the finger or touch tool and then dropping the object at that position.

"Pinching" is a user's motion of moving two fingers touching the screen in opposite directions. The pinching motion is a gesture to magnify (open pinch) or contract (close pinch) an object or a page. A magnification value or a contraction value is determined according to the distance between the two fingers.

"Swiping" is a user's motion of touching an object on the screen by using the finger or touch tool and simultaneously moving the object horizontally or vertically by a predetermined distance. A swiping motion in a diagonal direction may not be recognized as a swiping event.

The memory 170 may include a voice recognition module (not shown) that recognizes a voice of the user by using a voice recognition engine and transmits the recognized voice to the controller 160.

The context analysis module 173 may analyze a context, based on the plurality of pieces of event information collected by the sensor 130. For example, the context analysis module 173 may calculate an interest level of the user of the first device 100 in the content reproduced by the second device 200. In the present exemplary embodiment, the context analysis module 173 may calculate the interest level of the user of the first device 100 in the content reproduced by the second device 200, based on input information of the user, state information of the user, current position information, reservation history information, etc.

For example, when the user of the first device 100 performs a check-in procedure with respect to the second device 200 or the service zone of the second device 200 by using the first device 100, the context analysis module 173 may calculate a high interest level of the user of the first device 100 in the content reproduced by the second device 200.

The context analysis module 173 may calculate a probability that the user of the first device 100 might view the content reproduced by the second device 200, and therefore may calculate the interest level of the user of the first device 100. Here, the context analysis module 173 may calculate the probability that the user of the first device 100 might view the content reproduced by the second device 200, based on the state information of the user, the current position information, application information about an application executed in the first device 100, or the like.

For example, when the user of the first device 100 downloads to the first device 100 data that is provided by the second device 200, or inputs recommendation information to the first device 100 so as to recommend the content reproduced by the second device 200 to another user via an SNS, the context analysis module 173 may calculate a high probability (e.g., about 95%) that the user of the first device 100 might view the content reproduced by the second device 200.

Also, when a position of the first device 100 is not changed in the service zone of the second device 200 over a predetermined time period, and an input of the user is not sensed over a predetermined time period, the context analysis module 173 may calculate a high probability (e.g., about 90%) that the user of the first device 100 might view the content reproduced by the second device 200.

On the other hand, although the first device 100 is positioned in the service zone of the second device 200 over the predetermined time period, while the first device 100 is positioned in the service zone of the second device 200, if the first device 100 receives from the user of the first device 100 an execution request with respect to an application that is irrelevant to the content reproduced by the second device 200, the context analysis module 173 may calculate a low probability (e.g., about 30%) that the user of the first device 100 might view the content reproduced by the second device 200.

In the present exemplary embodiment, the context analysis module 173 may calculate the interest level of the user of the first device 100 in the content reproduced by the second device 200, based on information obtained by sensing the user's eyes via the camera 151.

When the first device 100 has a purchase history of purchasing a ticket with respect to the content reproduced by the second device 200, or has a check-in history with respect to the service zone of the second device 200, the context analysis module 173 may determine that the interest level of the user of the first device 100 on the content reproduced by the second device 200 is equal to or greater than a predetermined value.

In the present exemplary embodiment, the context analysis module 173 may analyze event information collected based on ontology, and thus may obtain information about the interest level of the user of the first device 100 on the content reproduced by the second device 200.

For example, the context analysis module 173 may obtain information about correlation between text/voice inputs by the user and the content reproduced by the second device 200, based on ontology. Based on the information about the correlation between the text/voice inputs by the user and the content reproduced by the second device 200, the context analysis module 173 may calculate the interest level of the user of the first device 100 on the content reproduced by the second device 200.

The recommendation item managing module 174 may manage recommendation items that are received from the management server 300, the second device 200, or the external device. Also, the recommendation item managing module 174 may directly generate a recommendation item, based on the information about the content which is received from the second device 200.

Figure 18:
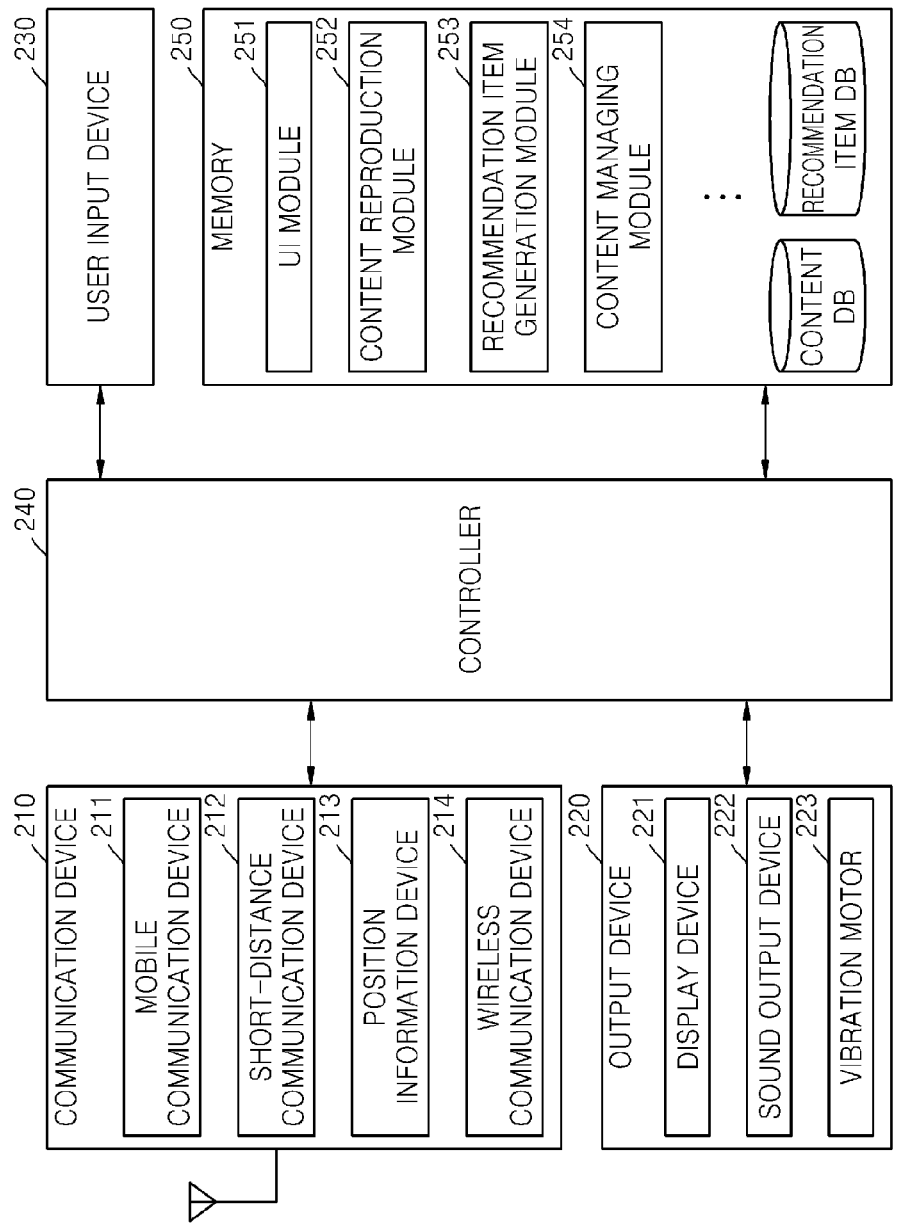
FIG. 18 is a block diagram illustrating a configuration of the second device according to an exemplary embodiment.

FIG. 18 is a block diagram illustrating a configuration of the second device 200, according to an exemplary embodiment.

As illustrated in FIG. 18, the second device 200 may include a communication device 210, an output device 220, a user input device 230, a controller 240 (also referred as a processor 240), and a memory 250. However, not all shown elements are necessary elements. That is, the second device 200 may be embodied with more or less elements than the shown elements.

Hereinafter, the aforementioned elements are described.

The communication device 210 may include one or more elements for allowing communication between the second device 200 and the first device 100, or communication between the second device 200 and the management server 300. For example, the communication device 210 may include a mobile communication device 211, a short-distance communication device 212, a position information device 213, and a wireless communication device 214.

In the present exemplary embodiment, examples of the short-distance communication may include, but are not limited to, Wi-Fi, Bluetooth, ZigBee, WFD, UWB, IrDA, BLE, and ANT+.

The communication device 210 may transmit information about content to the first device 100 or the management server 300. Also, the communication device 210 may transmit a recommendation item related to the content to the first device 100 or the management server 300.

The communication device 210 may periodically broadcast, via short-distance communication, information about the management server 300 which corresponds a recommendation item related to the content reproduced by the second device 200. The information about the management server 300 may include link information (e.g., a URL) for accessing the management server 300.

The output device 220 may function to output an audio signal, a video signal, or a vibration signal and may include a display 221, a sound output device 222, a vibration motor 223, or the like.

The display 221 displays and outputs information that is processed in the second device 200. For example, the display 221 may display on a screen the content reproduced by the second device 200.

Also, the display 221 may display the information about the management server 300 which corresponds to the recommendation item related to the content reproduced by the second device 200, via a 2D barcode (e.g., a QR barcode), a color code, a gray code, etc.

When the display 221 and a touch pad form a mutual layer structure and then are formed as a touch screen, the display 221 may be used as both an output device and input device. The display 221 may include at least one of an LCD, a TFT-LCD, an organic light-emitting diode display, a flexible display, a 3D display, and an electrophoretic display. Also, according to a type of the second device 200, the second device 200 may include at least two displays 221.

The sound output device 222 outputs audio data that is received from the communication device 210 or is stored in the memory 250. The sound output device 222 outputs a sound signal related to functions that are performed by the second device 200. The sound output device 222 may include a speaker, a buzzer, or the like.

The vibration motor 223 may output a vibration signal. For example, the vibration motor 223 may output the vibration signal that corresponds to an output of the audio data or video data. Also, when a touch is input to the touch screen, the vibration motor 223 may output a vibration signal.

The user input device 230 may be a device by which the user inputs data so as to control the second device 200. The user input device 230 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but one or more exemplary embodiments are not limited thereto.

The controller 240 may generally control all operations of the second device 200. That is, the controller 240 may execute programs stored in the memory 250 and therefore may control the communication device 210, the output device 220, the user input device 230, the memory 250, or the like.

The memory 250 may store a program to process and to control the controller 240, or may store a plurality of pieces of data (e.g., a recommendation item, information about content, sensing information, etc.) that are input/output.

The memory 250 may include at least one storage medium from among a flash memory-type storage medium, a hard disk-type storage medium, a multimedia card micro-type storage medium, card-type memories (e.g., an SD card, an XD memory, and the like), RAM, SRAM, ROM, EEPROM, a PROM magnetic memory, a magnetic disc, and an optical disc. Also, the second device 200 may drive a web storage that performs a storing function of the memory 250 via the Internet.

The programs stored in the memory 250 may be classified into a plurality of modules according to their functions, for example, into a UI module 251, a content reproduction module 252, a recommendation item generation module 253, a content managing module 254, or the like.

The UI module 251 may provide a UI, a GUI, or the like that are specialized according to a plurality of pieces of content or applications. The content reproduction module 252 may reproduce content. Functions of the UI module 251 and the content reproduction module 252 may be intuitionally deduced by one of ordinary skill in the art by referring to names of the sensors, thus, detailed descriptions thereof are omitted here.

The recommendation item generation module 253 may generate a recommendation item related to the reproduced content. For example, the recommendation item generation module 253 may generate a resume item by using a captured image of a screen reproducing the content, and reproduction position information indicating a reproduction position of the content at a point of time when the image is captured. Also, the recommendation item generation module 253 may generate an application item, an advertisement item, an additional information item, or the like that correspond to the reproduced content.

The content managing module 254 may manage the content reproduced by the second device 200, information about the content, or the like.

Figure 19:
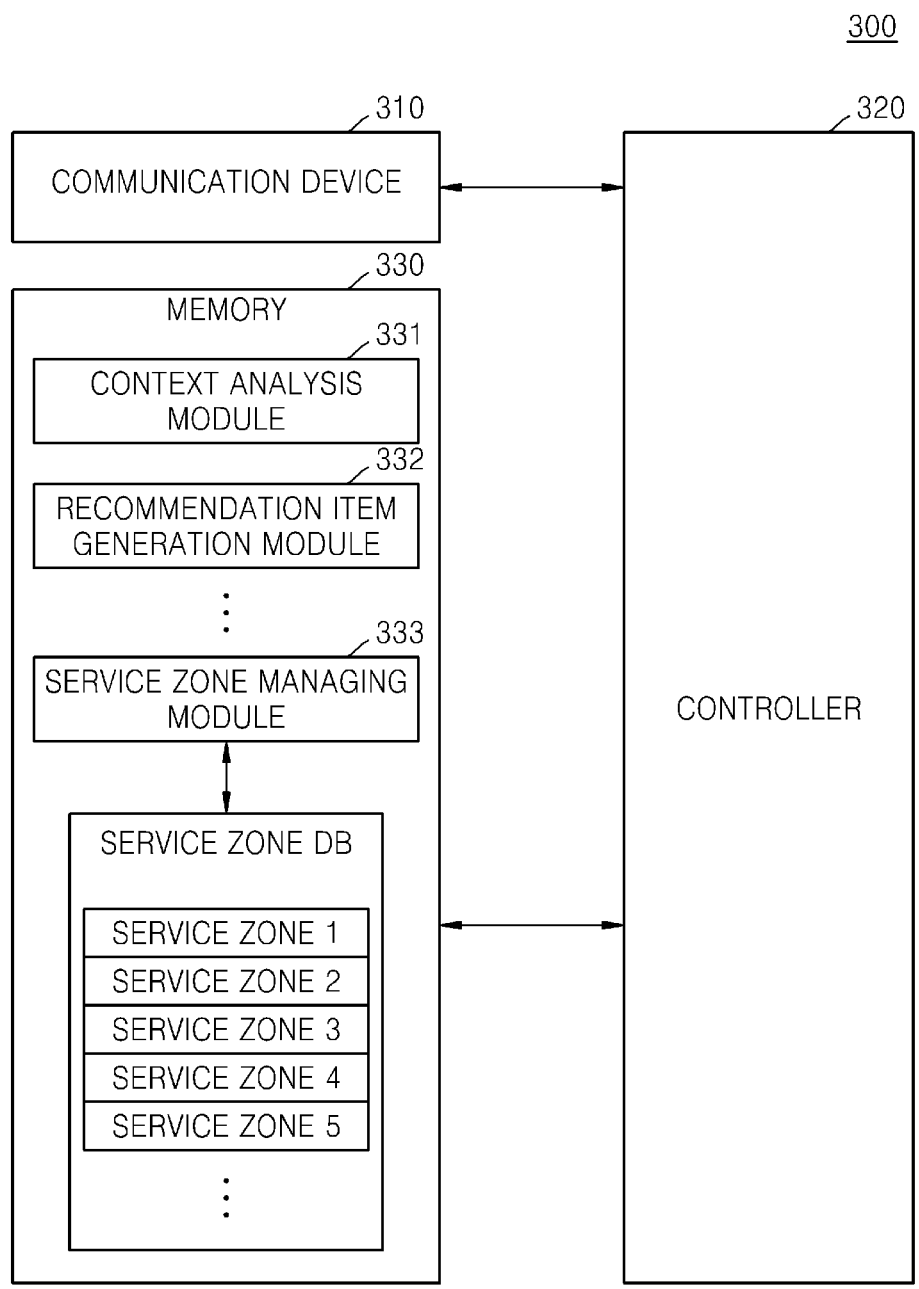
FIG. 19 is a block diagram illustrating a configuration of a management server according to an exemplary embodiment.

FIG. 19 is a block diagram illustrating a configuration of the management server 300 according to an exemplary embodiment.

As illustrated in FIG. 19, the management server 300 may include a communication device 310, a controller 320, and a memory 330. However, not all shown elements are necessary elements. That is, the management server 300 may be embodied with more or less elements than the shown elements.

Hereinafter, the aforementioned elements are described.

The communication device 310 may include one or more elements for allowing communication between the management server 300 and the first device 100 or communication between the management server 300 and the second device 200.

The communication device 310 may receive from the first device 100 a request for a recommendation item related to content reproduced by the second device 200. The communication device 310 may request the second device 200 for information about the content reproduced by the second device 200 and may receive the requested information. The communication device 310 may transmit to the first device 100 the recommendation item related to the content reproduced by the second device 200.

The communication device 310 may transmit the recommendation item related to the content to a cloud server that is connected to the first device 100.

The controller 320 may generally control all operations of the management server 300. That is, the controller 320 may execute programs stored in the memory 330 and therefore may provide to the first device 100 the recommendation item related to the content reproduced by the second device 200.

The memory 330 may store a program to process and to control the controller 320, or may store a plurality of pieces of data (e.g., a recommendation item, information about content, sensing information, etc.) that are input/output.

The programs stored in the memory 330 may be classified into a plurality of modules according to their functions, for example, into a context analysis module 331, a recommendation item generation module 332, a service zone managing module 333, or the like.

The context analysis module 331 may analyze a context, based on a plurality of pieces of event information collected by the first device 100. For example, the context analysis module 331 may calculate an interest level of the user of the first device 100 in the content reproduced by the second device 200, a probability that the user of the first device 100 might view the content reproduced by the second device 200, or the like. The context analysis module 331 may calculate the probability that the user of the first device 100 might view the content reproduced by the second device 200, based on input information of the user, state information of the user, position information, reservation history information, etc.

When the first device 100 has a purchase history of purchasing a ticket to view the content reproduced by the second device 200, or has a check-in history with respect to a service zone of the second device 200, the context analysis module 331 may determine that the interest level of the user of the first device 100 in the content reproduced by the second device 200 is equal to or greater than a predetermined value.

According to the present exemplary embodiment, the context analysis module 331 may analyze the plurality of pieces of event information collected by the first device 100 based on ontology, and thus may analyze the interest level of the user of the first device 100 on the content reproduced by the second device 200.

For example, the context analysis module 331 may obtain correlation information about correlation between text/voice inputs by the user and the content reproduced by the second device 200, based on ontology, and then, may calculate the interest level of the user of the first device 100 on the content reproduced by the second device 200, by using the correlation information.

The recommendation item generation module 332 may generate the recommendation item related to the content reproduced by the second device 200 at a point of time when the first device 100 exits the service zone of the second device 200, based on the information about the content which is received from the second device 200.

The recommendation item generation module 332 may generate a resume item by using captured image information obtained by capturing an image of the content reproduced by the second device 200 at the point of time when the first device 100 exits the service zone of the second device 200, and reproduction position information about a reproduction position of the content reproduced by the second device 200 at the point of time when the first device 100 exits the service zone of the second device 200. Also, the recommendation item generation module 332 may generate an application item, an advertisement item, an additional information item, etc., as the recommendation item, which correspond to the reproduced content.

The service zone managing module 333 may manage a plurality of pieces of information about the service zone of the second device 200 that provides a content reproduction service. For example, the service zone managing module 333 may manage a position of the second device 200, a location of the service zone of the second device 200, ID information of the second device 200, the information about the content reproduced by the second device 200, or the like.

According to the one or more exemplary embodiments, the first device 100 that is a personal device of a user, allows the user of the first device 100 to experience again via the first device 100 a service that the user experienced before via another device other than the first device 100.

One or more exemplary embodiments may also be embodied as programmed commands to be executed in various computer means, and then may be recorded to a computer-readable recording medium. The computer-readable recording medium may include one or more of the programmed commands, data files, data structures, or the like. The programmed commands recorded to the computer-readable recording medium may be particularly designed or configured for one or more exemplary embodiments or may be well known to one of ordinary skill in the art. Examples of the computer-readable recording medium include magnetic media including hard disks, magnetic tapes, and floppy disks, optical media including CD-ROMs and DVDs, magneto-optical media including floppy disks, and a hardware apparatus designed to store and execute the programmed commands in ROM, RAM, a flash memory, and the like. Examples of the programmed commands include not only machine codes generated by a compiler but also include great codes to be executed in a computer by using an interpreter. The hardware apparatus may be configured to function as one or more software modules so as to perform operations of one or more exemplary embodiments, or vice versa.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A first device configured to display an object related to content reproduced by a second device, the first device comprising:
   a sensor configured to sense an exit of the first device from a service zone of the second device during reproduction of the content by the second device;
   a communication device configured to request a management server for the object related to the content, the object comprising link information for receiving information about the content reproduced by the second device at a point of time when the sensor senses the exit of the first device from the service zone of the second device, and configured to receive the object related to the content from the management server; and a controller configured to control a display to display the received object related to the content on a predetermined screen of the first device.

2. The first device of claim 1, wherein the sensor senses a disconnection of communication between the first device and the second device.

3. The first device of claim 1, wherein the sensor is configured to sense the exit of the first device from the service zone of the second device based on a recognition by an external device located outside of the service zone of the second device, or located at a boundary of the service zone of the second device.

4. The first device of claim 1, wherein the controller is configured to obtain an interest level of a user of the first device in the content reproduced by the second device, based on event information collected by the first device, and request the management server for the object related to the content via the communication device if the obtained interest level is equal to or greater than a predetermined value.

5. The first device of claim 4, wherein the controller is configured to calculate a probability that the user of the first device will view the content reproduced by the second device, based on the event information collected by the first device.

6. The first device of claim 1, wherein the communication device is configured to request the management server for the object related to the content by transmitting at least one of information about the second device and information about the service zone of the second device to the management server.

7. The first device of claim 1, wherein the object related to the content comprises an image of the content connected to at least one of link information and index information.

8. The first device of claim 1, wherein the object related to the content comprises at least one of an application item corresponding to the content, a resume item corresponding to the content, an additional information item corresponding to the content, and an advertisement item corresponding to the content.

9. The first device of claim 1, wherein the controller is configured to control the display to display the object related to the content on a first screen which is displayed when an operation mode of the first device is switched from a standby mode to an active mode.

10. The first device of claim 1, wherein the service zone of the second device comprises at least one of a communication area where the first device communicates with the second device, and a viewing area where a user of the first device views the content reproduced by the second device.

11. A management server comprising:
a communication device configured to, when a first device exits a service zone of a second device which is reproducing content, receive from the first device a request comprising request information requesting an object related to the content, the object comprising link information for receiving information about the content, request the second device for the information regarding the content reproduced by the second device at a point of time when the first device exits the service zone of the second device in response to the request from the first device for the information, and receiving the information regarding the content from the second device; and
a controller configured to generate the object related to the content based on the information about the content, and transmit the generated object related to the content via the communication device to the first device.

12. The management server of claim 11, wherein the controller is configured to obtain an interest level of a user of the first device in the content reproduced by the second device, based on event information collected by the first device, and generate the object related to the content if the obtained interest level is equal to or greater than a predetermined value.

13. The management server of claim 11, wherein the request information comprises at least one of information about the second device and information about the service zone of the second device.

14. The management server of claim 11, wherein the communication device is configured to request the second device for the information about the content reproduced by the second device at a point of time when the request information is received from the first device.

15. A first device which displays an object related to content reproduced by a second device, the first device comprising:
a communication device configured to receive the object related to content reproduced by the second device, from the second device in a predetermined cycle, the object comprising link information for receiving information about the content; and
a sensor configured to sense an exit of the first device from a service zone of the second device during reproduction of the content by the second device; and
a controller configured to control a display to display the object related to the content on a predetermined screen of the first device at a point of time when the exit of the first device from the service zone of the second device is sensed.

16. The first device of claim 15, wherein the communication device is configured to request the second device for the object related to the content.

17. The first device of claim 15, wherein the object displayed on the predetermined screen comprises the object which was last received by the first device from the second device before the exit of the first device is sensed.

18. The first device of claim 15, wherein the controller is configured to obtain an interest level of a user of the first device in the content reproduced by the second device, based on event information collected by the first device, and control the display to display the object related to the content on the predetermined screen if the obtained interest level is equal to or greater than a predetermined value.

19. A first device which displays an object related to content reproduced by a second device, the first device comprising:
a communication device configured to request link information for receiving information about the content and to receive the information about content reproduced by the second device, from the second device when the first device is in a service zone of the second device;
a sensor configured to sense an exit of the first device from the service zone of the second device during reproduction of the content by the second device;
a controller configured to generate the object related to the content based on the received information about the content at a point of time when the exit of the first device is sensed; and
a display configured to display the generated object related to the content on a predetermined screen of the first device.

20. The first device of claim 19, wherein the controller is configured to obtain an interest level of a user of the first device in the content reproduced by the second device, based on event information collected by the first device, and generate the object related to the content when the obtained interest level is equal to or greater than a predetermined value.

21. The first device of claim 19, wherein the information about the content comprises at least one of a captured image of a screen which reproduces the content, reproduction position information which indicates a reproduction position of the content at a point of time when the image is captured, and link information for accessing the content.

22. The first device of claim 19, wherein the controller is configured to generate a resume item for the content based on the information about the content, which is received last by the first device before the exit of the first device is sensed.

23. A method of displaying an object related to content reproduced by a second device, the method performed by a first device and comprising:
   sensing an exit of the first device from a service zone of the second device during reproduction of the content by the second device;
   requesting a management server for the object related to the content, the object comprising link information for receiving information about the content reproduced by the second device at a point of time when a sensor senses the exit of the first device from the service zone of the second device;
   receiving the object related to the content from the management server; and
   displaying the received object related to the content on a predetermined screen of the first device.

24. The method of claim 23, wherein the first device comprises a personal mobile device, and
   wherein the second device comprises a public device.

25. The method of claim 23, wherein the sensing of the exit of the first device comprises sensing a disconnection of communication between the first device and the second device.

26. The method of claim 23, wherein the sensing of the exit of the first device comprises recognizing the exit of the first device by an external device located outside of the service zone of the second device or located at a boundary of the service zone of the second device.

27. The method of claim 23, wherein the requesting of the object related to the content comprises transmitting at least one of information about the second device and information about the service zone of the second device.

28. The method of claim 23, wherein the displaying of the object related to the content comprises displaying the object related to the content when an illuminance value outside the first device is equal to or greater than a predetermined value.

29. A non-transitory computer-readable recording medium having recorded thereon a computer program for executing a method performed by a first device comprising:
   displaying an object related to content reproduced by a second device;
   sensing an exit of the first device from a service zone of the second device during reproduction of the content by the second device;
   requesting a management server for the object related to the content, the object comprising link information for receiving information about the content reproduced by the second device at a point of time when a sensor senses the exit of the first device from the service zone of the second device;
   receiving the object related to the content from the management server; and
   displaying the received object related to the content on a predetermined screen of the first device.

30. A method of providing an object by a management server, the method comprising:
   when a first device exits a service zone of a second device reproducing content, receiving from the first device a request comprising request information requesting the object related to the content, the object comprising link information for receiving information about the content;
   requesting the second device for the information about the content reproduced by the second device at a point of time when the first device exits the service zone of the second device in response to the request from the first device for the information;
   receiving the information about the content from the second device;
   generating the object related to the content based on the information about the content; and
   transmitting the generated object related to the content to the first device.

31. The method of claim 30, wherein the generating of the object related to the content comprises:
   obtaining an interest level of a user of the first device in the content reproduced by the second device, based on event information collected by the first device; and
   generating the object related to the content when the obtained interest level is equal to or greater than a predetermined value.

32. The method of claim 31, wherein the obtaining of the interest level comprises calculating a probability that the user of the first device will view the content reproduced by the second device, based on the event information collected by the first device.

33. The method of claim 30, wherein the receiving of the request information comprises receiving at least one of information about the second device and information about the service zone of the second device.

34. A method of providing to a first device, a recommendation item related to content reproduced by a second device, the method comprising:
   reproducing the content by the second device while the first device is in a service zone of the second device;
   calculating an interest level of a user of the first device in the content reproduced by the second device;
   determine whether the interest level of the user is equal to or greater than a predetermined value;
   requesting, by the first device, the recommendation level related to the reproduced content based on a result of the determining of the interest level of the user;
   sensing an exit of the first device from the service zone of the second device, and
   displaying the recommendation item on a display of the first device.

35. The method of claim 34, wherein the interest level of the user is calculated based on a plurality of pieces of event information.

36. The method of claim 35, wherein the plurality of pieces of event information is at least one of input information of the user, state information of the user, the current position information of the user, and reservation history information of the user.

37. The first device of claim 1, wherein the communication device is further configured to request the management server for the object related to the content according to an interest level of a user of the first device in the content reproduced by the second device.

38. The first device of claim 1, wherein the service zone is a zone at which the second device is capable of providing a service to the first device, and the communication device is further configured to request the management server for the object related to the content in response to the exit of the first device from the service zone.

* * * * *